US 7,644,134 B2

(12) United States Patent
Cohen et al.

(10) Patent No.: US 7,644,134 B2
(45) Date of Patent: Jan. 5, 2010

(54) SYSTEM AND METHOD FOR ANALYZING SYSTEM VISITOR ACTIVITIES

(75) Inventors: Tal Cohen, Tucker, GA (US); Nissim Harel, Tucker, GA (US); Dean Jerding, Roswell, GA (US); Ami Feinstein, Decatur, GA (US)

(73) Assignee: Clickfox, LLC, Atlanta, GA (US)

( * ) Notice: Subject to any disclaimer, the term of this patent is extended or adjusted under 35 U.S.C. 154(b) by 1372 days.

(21) Appl. No.: 10/190,313

(22) Filed: Jul. 5, 2002

(65) Prior Publication Data
US 2003/0115333 A1 Jun. 19, 2003

Related U.S. Application Data

(60) Provisional application No. 60/303,683, filed on Jul. 6, 2001.

(51) Int. Cl.
*G06F 15/16* (2006.01)
(52) U.S. Cl. .................................... 709/218
(58) Field of Classification Search ................. 709/100, 709/218, 227; 707/10
See application file for complete search history.

(56) References Cited

U.S. PATENT DOCUMENTS

| | | | |
|---|---|---|---|
| 5,809,250 A | 9/1998 | Kisor | |
| 5,870,559 A * | 2/1999 | Leshem et al. | 709/224 |
| 6,052,730 A | 4/2000 | Felciano et al. | |
| 6,112,240 A | 8/2000 | Pogue et al. | |
| 6,134,532 A | 10/2000 | Lazarus et al. | |
| 6,195,679 B1 | 2/2001 | Bauersfeld et al. | |
| 6,310,630 B1 | 10/2001 | Kulkarni et al. | |
| 6,338,066 B1 * | 1/2002 | Martin et al. | 707/10 |
| 6,448,980 B1 * | 9/2002 | Kumar et al. | 715/745 |
| 6,510,451 B2 * | 1/2003 | Wu et al. | 709/203 |
| 6,539,375 B2 | 3/2003 | Kawaski | |

\* cited by examiner

*Primary Examiner*—Jeffrey Pwu
*Assistant Examiner*—Farhad Ali
(74) *Attorney, Agent, or Firm*—Troutman Sanders LLP; James E. Schutz

(57) ABSTRACT

A method of analysis of the performance of defined visitor tasks at a host's web site. Tasks are defined a sequence of web pages with which the host wishes the visitor to view or interact. The method allows a given task to be provided, compares the desired task to current visitor behavior to determine frequency, manner and completion of the task and analyzes the task-related information for anomalies and trends in the completion, or lack thereof, of the desired tasks.

40 Claims, 16 Drawing Sheets

SYSTEM AND METHOD FOR ANALYZING SYSTEM VISITOR ACTIVITIES

RELATED APPLICATION

This application claims priority based on Provisional Patent Application No. 60/303,683 filed Jul. 6, 2001 and entitled "System And Method For Analyzing Web Site Visitor Activities And Customizing Web Pages".

FIELD OF THE INVENTION

This invention provides a unique system and method for analyzing a visitor's performance of tasks of a system, preferably web site visitor's performance of task, comparing expected visitor behavior with observed visitor behavior, and discovering anomalies or trends in the visitor's behavior. The discoveries can be used to alter the web site structure to better facilitate visitor tasks. The invention can be applied to user interactions with systems that can be characterized and recorded as a sequence of steps.

BACKGROUND OF THE INVENTION

When an entity (the "host") constructs a World Wide Web (the "web") site or application (hereafter "site"), it typically seeks to structure the web site in a manner that allows the web site visitor (the "visitor") to perform certain tasks in connection with the web site. These tasks generally comprise visitor interactions with a particular sequence of web pages via a user-interface such as in a web browser application. Because the web offers a freedom of choice to the visitor to leave the web site at any time and travel instantaneously to a competing web site, it behooves the host to design the site to afford the goals of the visitor as efficiently as possible.

The majority of visitors to a web site have a particular goal in mind. The business effectiveness of the web site can be measured by how efficiently it allows the visitors to accomplish their goals. Web sites that don't communicate to visitors what can be done at the site and how will not succeed in retaining visitors. Moreover, the goals of the site as set forth by the designers often do not match the goals of the site visitors. Understanding what the visitors are doing and how they are doing it is necessary for maximizing the business effectiveness of a web site.

If the visitor completes their task(s) in a lengthy or roundabout manner, or cannot complete the expected or desired task(s), or attempts to perform different tasks than the site designer expected, then the host would benefit from a tool to evaluate the anomalies or trends in the visitor's behavior. Through the host obtaining such information, the host could then modify the web site in order to increase the likelihood that the visitor completes the tasks for which the web site was intended and that the web site facilitates the visitor's desired task(s). The host could also use the information for a wide range of other purposes, such as reducing the cost of maintaining the web site, directing marketing campaigns, etc.

Although there currently exists a manner to customize a web site by tracking visitor behavior, described in detail in Applicant's United States patent application entitled "System and Method for Providing Customized Web Pages", herein incorporated by reference, there is a tremendous benefit in having the ability to track and analyze the performance of certain defined tasks. These tasks can be known to the site host because the site was designed to facilitate such tasks, or be uncovered by analyzing visitor interaction with the web site. Current web site log analysis tools count the most common paths visitors took through the site, but these paths are typically the home page, the home page plus the second most visited page, the home page plus the third most visited page, etc. The paths don't have any inherent relevance to the visitor tasks the web site was designed to support, and the tools don't provide any insight into how the visitors performed variations on, entry and exit to, etc. a particular common path.

Consequently, a system and method are needed that allows an expected visitor task to be defined in the context of the site, and that analyzes observed visitor behavior to identify which visitors performed what parts of the task, when and how. Further, a system is needed that presents the relevant task performance information in a meaningful and comprehensible manner, providing recommendations that can be acted upon by the host to improve the web site. Armed with this knowledge and recommendations to change the web site from the system, the host can make decisions about how to change the web site to better facilitate visitor tasks and to better facilitate the tasks for which the site was designed.

BRIEF SUMMARY OF INVENTION

Briefly described, the present invention is an innovative task analyzer of user interaction with a system. The present invention in its preferred form allows for the analysis of the performance of defined visitor tasks in a web site. Tasks can be defined as a sequence of web pages with which the host wishes or expects the visitor to view or interact. For example, a task can comprise a visitor viewing one or more web pages A1 through A9 that contain a product that is for sale, and then proceeding to a shopping cart web page S1, and then finally to a payment web page P1. Under this example, the task would comprise three steps: (any of A1-A9), S1 and P1. Another example might be a task that comprises of visiting the home page H1, and the employment page E1.

In a preferred embodiment described herein, the certain aspects of this invention are implemented in computer software (hereafter "software") including both innovative analytic aspects and innovative presentation aspects via a graphical user-interface. The software allows the user to define the desired tasks or the software can provide the defined tasks itself based on an analysis of actual visitor behavior and settings provided by the user. Once the tasks are defined, the software examines a web site and its logs or other recordings of visitor interaction to determine the occurrences of the task, when and how much of the task was completed and by whom, and whether visitors complete such tasks directly or indirectly. The user of the software can focus the software's analysis by supplying several task analysis parameters, such as the manner and frequency of task completion on which the user wishes to focus. The software's examination of the web site visitor activity also generates other information about the task(s) such as path statistics or information on related or similar tasks. Once data on the visitors completion of a task is generated, the software then applies various algorithms to the data to compile a list of anomalies or trends that appear in completion of each task. Based on these anomalies and trends, the computer software generates a list of recommendations for modification of the web site to better facilitate visitor's performance of the task(s). The task performance data and recommendations are then presented to the user of the software in an interactive visual user-interface. Examination of the visual displays create further knowledge and hypotheses about why the visitors behave the way they do and how the web site can be improved. The software can then generate changes to the web site based on these recommendations or the host can use these recommendations for the host's own modifications of the web site or as a basis for the host's web site related decisions.

Another embodiment of the invention applies to the Interactive Voice Response (hereafter "IVR") domain, where the system is an IVR application and the visitors interact with the system via audio prompts and responses. Such a system has a similar structure of steps or states of interaction that are linked to other steps or states via the programming of the IVR system, just as a web site consists of several steps or pages that are hyper-linked based on the design of the web site. The software for this embodiment of the invention allows tasks to be defined based on the audio forms and prompts, and analyzes the interaction of the visitor with the IVR system to determine how such tasks are performed.

As such this invention is capable of analyzing task performance for any system providing a user interface, with which a user interacts in a sequence of steps or states that can be recorded for analysis.

These and other objects, features and advantages of the present invention will become more apparent upon reading the following specification in conjunction with the accompanying drawings.

DETAILED DESCRIPTION OF A PREFERRED EMBODIMENT

Figure 1:
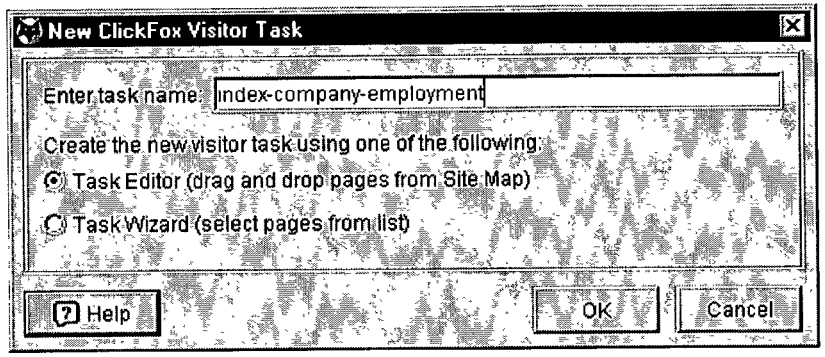
FIG. 1 is a new task dialog allowing the user to create a new task using either the Task Editor or the Task Wizard, set to create a task using the Task Editor.

The present invention is an innovative task analyzer of user interaction with a subject system. The invention in its preferred form allows for the analysis of the performance of defined visitor tasks in a web site. The present invention is a system and method comprising the following steps: defining a task as at least one step of interaction with the subject system, providing task analysis parameters, determining from the interactions with the subject system the performance of the task according to the task analysis parameters, generating data regarding the performance of the task and recommendations for improving the subject system to better afford the task completion, and presenting the data via an interactive graphical user-interface. Preferably, the invention analyzes the tasks performed by web site visitors to a web site, where the steps are web site pages.

TABLE 1

| | |
|---|---|
| Click-away | The act of a visitor leaving a site. Counted for the last step in a session of interaction with a system. |
| Click-in | The act of a visitor entering a site. Counted for the first step in a session of interaction with a system. |
| Next | The next page after a page or task or task step, depending on the context. |
| Page | A document or content in a web site, as experienced by a web site visitor via their web browser. A web page. Generally applied to describe a state the user experiences in the interaction with a system. |
| Referral | The page before a page or task or task step, depending on the context. |
| Session | A sequence of pages, or steps, that a unique site visitor visited without a large time gap between any two pages. Also called a site visit. Applied in general to a session of usage by a particular visitor with a system. |
| Site | A set of web pages from the same host characterized by a start URL and a click distance from the start URL. All of the pages reachable from that site URL up to the number of clicks away from the site URL are included in the site if their URL contains the same path as the site URL. |
| Site Project | The set of sites that the present invention is analyzing, including the log files for the sites, tasks defined for the sites, and reports created for the sites. The sites can come from more than one host. |
| Task | A sequence of pages that the visitor visits in a site. Defined as a sequence of task steps, each step containing one or more pages. Generally a sequence of steps in interaction with a system. |
| Task Step | A task is defined as a sequence of task steps, each step containing one or more pages. |
| Visit | A sequence of pages that a unique site visitor visited without a large time gap between any two pages. Also called a session. |

The majority of visitors to a web site have a particular goal in mind. The business effectiveness of the web site can be measured by how efficiently it allows the visitors to accomplish their goals. Web sites that don't communicate to visitors what can be done at the site and how will not succeed in retaining visitors. Moreover, the goals of the site as set forth by the designers often do not match the goals of the site visitors. Understanding what the visitors are doing and how they are doing it is necessary for maximizing the business effectiveness of a web site.

The present invention characterizes visitor behavior as a set of "tasks" that the visitor performs. A specific task can be expressed as a sequence of pages, or "steps", that the visitor follows. During their visit to a system such as a web site the visitor might perform several tasks to accomplish their goals.

Take for example a web site that sells toys. For the past month, the site has been promoting a new brown robot dog. While visitors continue to purchase other robot dogs, not many are purchasing brown robot dogs. With the present invention, the site designer can define a sequence of pages she expects the visitors to follow when purchasing robot dogs and generate a report. Examining the results, she can learn where and why visitors do not behave as she expected, and what to do in order to expose more of them to the brown robot dog.

When defining a task, each step can contain one or more pages. In the above example, the following task could be defined to track "visitors purchasing robot dogs."

| | |
|---|---|
| Step 1: | index.html |
| Step 2: | robot_dogs.html |
| Step 3: | big_robot_dog.html |
| | little_robot_dog.html |
| | brown_robot_dog.html |
| Step 4: | shopping_cart.html |
| Step 5: | checkout.html |

In this example, the user has specified that Step three includes one of the three pages regarding robot dogs.

The present invention further provides an analysis of how the visitors perform a task and recommendations for improving task performance. Such analysis determines, among others, how many visitors completed the task, what paths are taken through the task, where visitors go after each step, and how traffic to the task can be increased. It also compares the behavior of different populations of visitors that perform the task, such as identifying behavior of visitors from different geographical regions or using different web browsers.

The preferred embodiment of the present invention analyzes a defined task against a particular set of visits to the site. The visits used are constructed from web site logs, using session reconstruction algorithms. Prior to task analysis, visits can be filtered, for example, according to a date range, visit duration, site access pages, pages visited and not visited in the site, visitor demographics (identity, geography, repeat, etc.), and web browser.

A user can define the task to be analyzed, or, alternatively, the present invention can detect visitor tasks automatically based on little or no input from the user.

Site Representation

A web site is represented by the present invention as a directed graph where the nodes represent pages in the site that a visitor experiences via their web browser, and the edges represent links between the pages. The "Site" is a set of pages of interest defined by a root or starting site URL and a click distance from that site URL. All of the pages reachable from that site URL up to the number of clicks away from the site URL are included in the site if their URL contains the same path as the site URL. Such pages are identified as "project" pages. Pages that aren't part of the project but that come from the same host as the site URL are called "inside" pages. Pages that aren't part of the project and don't come from the same host as the site are called "outside" pages. The structure of the web site is ascertained by spidering or crawling the site to construct the graph representation.

The "Site Project" is the set of sites chosen by the user that the present invention is analyzing, including the log files for the sites, tasks defined for the sites, and reports created for the sites. The sites can come from more than one host.

Session Representation

The logs for the sites are parsed to create sessions, or visits, to the site by a particular visitor that take place within a particular amount of time. A session reconstruction algorithm in utilized, wherein a session is a sequence of pages that a particular visitor visited. The session reconstruction uses the site structure to predict exactly which pages the user visited even though not all pages are retrieved from the web server by the web browser. Each session has a start and end time.

For the logs provided in the Site Project, a master set of sessions is constructed. When a user directs the invention to create reports about the visitor behavior, they can specify visit filters that select particular sessions from the master set to include in the report. The visit filter can be based on parameters, such as date and time, site access, pages visited, tasks performed, and demographics. Statistics and recommendations included in the reports will reflect only visits and visitors that meet the criteria. Filtering sessions using tasks can be utilized.

For the purposes of the task analysis, the invention can be configured by the user to ignore inside or outside pages, or represent a contiguous group of these pages with a single "dummy" page indicating that the visitor left the site of interest. For examples, see hereinafter "Examples of Task Regular Expression Matching".

Notation

Examples throughout this application will use the following alpha-numeric notation:
<page type><page ID>: a page in the site, e.g.

| | |
|---|---|
| | "P1" is a project page of interest with the ID 1 |
| | "I12" is a page inside the site host but not inside the site project |
| | "D1" is a dummy page representing out of the site project |
| T: | a task as a sequence of steps, a step with more than one page enclosed in "( )", e.g. |
| | P2 (P3 P10) |
| | as a 3 step task with 2 pages in the third step |
| S: | a session, or a visit to the site, as a sequence of pages e.g. |
| | P1 P2 P3 P2 P4 P3 |
| | Matching a task in a session is indicated with brackets '[]' |
| | and the pages matching task steps are underlined, e.g. |
| | P1 [P2 P3] [P2 P4 P3] |
| | shows two matches for the task. |

Task Definition

In its simplest form, a task is a sequence of pages. When a task is identified in the visitor behavior, each step in the task corresponds to a set of one or more pages in the web site. However, the task definition can be more abstract as in a task template input by the user. Additionally, the task definition can be input by the user or determined by the present invention automatically.

A task is an ordered sequence of task steps. A task step is a set of one or more pages in the site being analyzed. If there are multiple pages in a task step, this means that a visit to any one of the pages constitutes completion of that step. The length of the task is thus the number of task steps—this is the minimum number of pages that must be visited for the task to be completed.

Given an example task T,

```
T:      P2      P3      (P5 P6)
        and session S,
S:      P1      P2      P3      P4      P1      P5
        there is a match as underlined:
S:      P1      [P2     P3      P4      P1      P5]
Match:          1       2                       3       (step)
```

The invention treats task steps with more than one page as a logical OR, meaning that any one of the pages being visited constitutes completion of that step. Alternatively, a task analysis parameter allows the multi-page step to be treated as a logical AND meaning that all of the pages in the step must be visited but in no particular order.

When a standard task is defined in terms of pages, it is thus associated with a particular web site. However, specification for a task step can also be done in a more generic way. For example, a step might be defined as the following:

The set of pages in a particular site whose URL contains a text string

The set of pages in a particular site whose URL doesn't contain a text string

Any page in the site (i.e. a wildcard step)

All of the pages linked from a particular referring page

The page identified by the $n^{th}$ link provided in a particular referring page The set of pages in a site whose URL matches an arbitrary regular expression As is apparent from the list above, advanced tasks need not be tied to a particular site.

The present invention provides several ways to enable a visitor to define the task. Task definition can be input by the user of the software, e.g. the web site designer or a web site analyst. The present invention provides an interactive graphical Task Editor and a text-based Task Wizard that allow the user to define tasks. The user can alternatively select a focal page as the start, end, or intermediate step in a task and provide the task length, via the graphical Site Map viewer. The present invention identifies the most common such tasks for a given set of visits in a report. The present invention also can automatically identify the most common tasks beginning and ending with the most often visited pages. The number of top pages, the number of tasks to return, and the length of the task is configurable by the user as input to the software. Further, the invention can display an interactive graphical view of the visitor behavior, the Visit Tracker, that allows the user to identify common tasks visually and create a task definition. In yet another example, the invention can employ a fully automatic dominant task detection engine that works to provide the user with an exhaustive list of dominant tasks.

Visitor Task Analysis

Any set of visits to a system such as web site can be analyzed to see if and how a particular task was performed. There are several different types of analysis involved, the crux of which is identifying occurrences of the task in the set of visits to the site. Once this is done, statistics can be gathered for these occurrences, paths recorded, visitor population insight generated, and recommendations created.

Finding occurrences of the task comprises the use of a pattern-matching algorithm. The present invention can identify occurrences of the full task (completions), or any sub-task made up of the first n steps of the task (partial completions). Completions can be either direct completions, or indirect completions.

The analysis is directed by several task analysis parameters that the user can define for a particular task report. One of the task analysis parameters specifies that completion of the task requires no other pages be visited between the defined task steps. This is known as direct task completion, as opposed to a default indirect task completion. Here is an example:

```
T:   P1   P2   P3
S:   P1   P2   P1   P2   P3
     With indirect completion the first visit to a page in a step matches the step:
S:   P1   P2   P1   P2   P3
     The second P1 and P2 are said to occur between steps 2 and 3. With direct
completion the match must be contiguous:
S:   P1   P2   P1   P2   P3
     A further parameter of the direct completion specifies whether all nodes in a step are
matched or just the first (a logical AND). For example,
T:   P1   (P2 P3)
S:   P1   P2   P3   P4
     With intra-step page matching,
S:   P1   P2   P3   P4
     Without intra-step page matching,
S:   P1   P2   P3   P4
```

The present invention task analysis can be performed with one of several different options for determining the number occurrences of tasks in a session, as shown in the following table:

TABLE 2

| Type of Match | Explanation |
| --- | --- |
| Match All | Match all occurrences of the task in the session, including overlaps. Start a subsequent match attempt from the page after the previous match's first step match. |

TABLE 2-continued

| Type of Match | Explanation |
|---|---|
| Match All Not Overlapping | Match all occurrences of the task in the session, excluding overlaps. Start a subsequent match attempt after the end of the longest sub-task that matches at the previous match's start. At a minimum this is the end of the previous match. |
| Match Only After Completion | Similar to Match All Not Overlapping with the added constraint that a further match is only performed if the previous match completed the task. |
| Match First | Match only the first attempt at performing the task in the session. |
| Match $N^{th}$ | Match the $n^{th}$ attempt at performing the task in the session. |
| Match Head | Match a task only if it occurs at the beginning of the session, i.e. the visitor clicks in to the site and immediately starts the task. There can be only one match per session. |
| Match Tail | Match a task only if it occurs at the end of the session, i.e. the visitor performs the task and immediately clicks away from the site. There can be only one match per session. |
| Match Both | Match both head and tail. |

Depending on the version and/or configuration of the present invention, the user may or may not be presented with all of the above options in the user-interface. The choice of which option to use is made by the user based on the type of analysis they wish to perform. As an example, given task and session,

```
T:      P1 P2 P3
S:      P1 P2 P4 P5 P1 P5 P2 P1 P2 P3 P2 P4 P1 P2 P3 P4
        Identifying task T using direct task completion and "match all" leads to four matches:
S:      [P1 P2] P4 P5 [P1] P5 P2 [P1 P2 P3] P2 P4 [P1 P2 P3] P4
        Identifying task T using indirect task completion and "match all" leads to four
different (complete) matches:
S:      [P1 P2 P4 P5 [P1 P5 P2 [P1 P2 P3]]] P2 P4 [P1 P2 P3] P4
Match:
Match:
Match:
```

Note that there are three matches that overlap above.

For this example task T and session S, identifying task T using direct task completion and "match all not overlapping" leads to the same as direct task completion with "match all". However, identifying task T using indirect task completion and "match all not overlapping" leads to only two matches:

```
S:      [P1 P2 P4 P5 P1 P5 P2 P1 P2 P3] P2 P4 [P1 P2 P3] P4
        Identifying task T using direct task completion and "match first" leads to one
complete match. Note that the first P1 and P2 do not match because there is a longer match
later:
S:      P1 P2 P4 P5 P1 P5 P2 [P1 P2 P3] P2 P4 P1 P2 P3 P4
        While identifying task T using indirect task completion and "match first" leads to a
complete match at the start:
S:      [P1 P2 P4 P5 P1 P5 P2 P1 P2 P3] P2 P4 P1 P2 P3 P4
        Identifying task T using direct task completion and "match head" leads to a partial
match at the start:
S:      [P1 P2] P4 P5 P1 P5 P2 P1 P2 P3 P2 P4 P1 P2 P3 P4
```

However, identifying task T using direct task completion and "match tail" leads to no match.

Task Identification Algorithm

The present invention comprises a task identification algorithm. The task identification algorithm includes the following steps:

(I) Begin with a set of sessions to be analyzed; each session being a sequence of pages that represent a visit to the web site.

(II) Construct a task to be identified as a sequence of task steps, each step being one or more pages.

(III) Define the parameters of the task identification: direct or indirect completion, number of occurrences per session.

(IV) Select the sub-task of the task from (II) to identify in the sessions. A sub-task is a task made up of the first n steps of the original task, where n is less than or equal to the number of steps in the task of interest. For example, this option allows occurrences where visitors performed at least the first two steps of a three step task to be located. A sub-task with the number of steps equal to the task length is the full task.

(V) For each session being analyzed:
    (A) If the number of occurrences per session is "match first":

(1) For each sub-task from the full task down to the requested sub-task (in (IV)):
  (i) Find the next occurrence of the sub-task in the session.
  (ii) If there is a match, record the match and continue (V) with the next session.
  (iii) If there is not a match go to (1) with the next shortest sub-task.
(2) If the original sub-task has been tried and no match was found, go to (V) with the next session.
(B) If the number of occurrences per session is "match head":
  (1) Find the next match of the sub-task from (IV) in the session.
  (2) If there is a match at the beginning of the session, record the match location.
  (3) Continue step (V) with the next session.
(C) If the number of occurrences per session is "match tail":
  (1) Find the next match of the sub-task from (IV) in the session.
  (2) If there is a match located where a full task match from that position would end up at the end of the session, record the match.
  (3) If the match was recorded continue step (V) with the next session.
  (4) If the match was not recorded go to step (1).
  (5) When the end of the session is reached, go to step (V) with the next session.
(D) If the number of occurrences per session is "match all":
  (1) Find the next match of the sub-task from (IV) in the session.
  (2) If the match is not a sub-set of the previous match record it.
  (3) If the match was recorded, backup in the session to the end of the first step match and go to step (1).
  (4) If the match was not recorded move forward by one page from where the search started in (1) and go to step (1).
  (5) When the end of the session is reached, go to step (V) with the next session.
(E) If the number of occurrences per session is "match all not overlapping":
  (1) Find the next match of the sub-task from (IV) in the session.
  (2) Record the match.
  (3) Find the longest sub-task of the full task (including the full task itself) that can be matched from the start of the match in step (1).
  (4) Advance to the end of the match from (3) and go to step (1).
  (5) When the end of the session is reached, go to step (V) with the next session.
(F) If the number of occurrences per session is "match only after completion":
  (1) Find the next match of the sub-task from (IV) in the session.
  (2) Record the match.
  (3) If there is a full task match starting at the same location as the start of the match in (1), advance to the end of that full task match and go to step (1).
  (4) If there is not a full task match at that location, continue (V) with the next session.
  (5) When the end of the session is reached, go to step (V) with the next session.

In one embodiment, the present invention uses regular expressions for the task and a text-based representation of the pages in the visitor sessions to implement the searches in the task identification algorithm for steps: (V.A.1.i), (V.B.1), (V.C.1), (V.D.1), (V.E.1), (V.E.3), (V.F.1), and (V.F.3). However, the matching algorithm itself can be implemented using other types of representations and searching.

Performing the task identification searches using regular expressions requires the following:

For the sub-task being identified, translate the task definition to a regular expression given the task, the site being analyzed, and the task identification parameters. For examples, see hereinafter "Examples of Task Regular Expression Matching".

For each session being analyzed, construct a string representation of the session suitable for regular expression matching, e.g. each page in the session is identified by an alphabetic node type and a numeric node ID. For examples, see hereinafter "Examples of Task Regular Expression Matching".

Task Statistics

Based on the occurrences of the task that are identified in a particular set of sessions, a number of task statistics are created. Statistics include, but are not limited to, started task versus site visits, overall completion counts, completed through step, step length, task efficiency (actual length in pages of performed task including non-task pages versus minimum if only task pages are visited), task completion time, click-ins and click-aways. Traffic flow results indicate how many visits performed each step of the task and for each stage where visitors went when they departed the task. The task statistic data is described in

TABLE 3

| Task Statistic | Definition |
| --- | --- |
| Task starts | Number of occurrences of a visitor starting the task. |
| Task completions | Number of task completions by visitors. |
| Visits that started task | Number of visits that included a start of the task. |
| Visits that completed task | Number of visits that included a completion of the task. |
| Avg. starts per visit | Average number of task starts per visit. For matches that allow only one match per session this can't be greater than 1.0, but for match all, etc. that allow multiple matches it can. |
| Avg. completions per visit | Average number of task completions per visit. |
| Avg. clicks to complete | The average number of clicks made by visitors from the start of the task to the end. The average length in pages of the matches that completed the task. |
| Task efficiency | Avg. clicks to complete divided by the minimum clicks to complete (the number of task steps). |

TABLE 3-continued

| Task Statistic | Definition |
| --- | --- |
| Avg. time to complete | The average amount of time visitors took from the start of the task to the end. |
| Task completed first in visit | The number of occurrences where the task was completed as the first thing a visitor did in the visit. Visitor clicked-in to the start of the task and completed it. |
| Avg. page views before start task | For all occurrences of starting the task, the average number of pages a visitor viewed before starting the task. |
| Avg. time before start task | For all occurrences of starting the task, the average time a visitor spent in the site before starting the task. |
| Top referring pages | The pages from which the most visitors came to the start of the task. |
| Task completed last in visit | The number of occurrences where the task was completed as the last thing a visitor did in the visit. Visitor completed the task and clicked-away from the site. |
| Avg. page views after first completion | For the first completion in each visit, the average number of pages a visitor viewed after competing the task. |
| Avg. time after first completion | For the first completion in each visit, the average amount of time a visitor spent in the site after competing the task. |
| Top next pages | The pages to which the most visitors went after completing the task. |
| Total hits for each step | For each task step, the total number of hits pages in that step received. |
| Task hits for each step | For each task step, the number of hits pages in that step received while visitors were performing the task. |
| Total departures for each step | For each task step, the number of occurrences of visitors leaving that task step. |
| Departures into site for each step | For each task step, the number of occurrences of visitors leaving that task step and going to another page in the site. |
| Departures out of site for each step | For each task step, the number of occurrences of visitors leaving that task step and going out of the site. |
| Avg. pages for each step | For each task step, the average number of pages in the task step visitors visited. For a task step defined with only one page this will be 1.0, but if there are more than one page in the task step this can be greater than one. |

Task Statistics Algorithm

The present invention further comprises a task statistics algorithm. The task statistics algorithm includes the following steps:
 (I) For each step in the task do the following:
  (A) Construct a sub-task containing all of the task steps up to and including the current step.
  (B) For each identified occurrence of the full task in the set of sessions being analyzed, determine if the occurrence also completed the sub-task. If so, do the following:
   (1) Add to count for cumulative total of statistics such as completions, number of steps to complete, time to complete, etc. for the sub-task.
   (2) If this occurrence is the first in a session increment the count of unique visits completing the sub-task.
  (C) Compute the average and standard deviation of applicable statistics based on the total and the number of occurrences completing the sub-task.

Task Path Analysis

Based on the occurrences of the task that are identified in a particular set of sessions, the set of actual paths followed by visitors while performing the task is created. A path is a sequence of pages visited while performing the task. The Task Path analysis computes paths for occurrences that completed the entire task and for occurrences that completed the task through each step in the task. Included in the list of paths for a particular number of task steps are the specific referral and next pages for each of the paths. The referral page is the page the visitor visited preceding the first step and the next page is the page a visitor visited immediately after the last requested task step.

For example, the task path data interface supports queries such as the following, "Identify all of the paths for visitors that completed the task through step two (out of three), including the referral and next page."

Task Path Algorithm

The present invention further comprises a task path algorithm. The task path algorithm includes the following steps:
 (I) Initialize an empty list of task path records
 (II) For each step in the task do the following:
  (A) Construct a sub-task containing all of the task steps up to and including the current step.
  (B) For each identified occurrence of the full task in the set of sessions being analyzed, determine if the occurrence also completed the sub-task. If so, do the following:
   (1) Create a record for the path that matched the occurrence if one doesn't exist already, and add it to the list of path records.
   (2) Increment the count of the path record.
   (3) Add a record of the referral and next page for this path to the list of referral and next pages in the path's record.
  (C) Sort the list of path records by decreasing occurrence count.

Related Tasks

Related tasks are identified by first determining the occurrences that completed the original task through the first n steps and did not complete the original task through task step n+1. Then the dominant paths of the same length of the original task are constructed out of the result. These are the related tasks.

Related Tasks Algorithm

The present invention further comprises a related tasks algorithm. The related tasks algorithm includes the following steps:
(I) For n=task steps minus 1 down to 1:
  (A) Construct the sub-task of the task through step n.
  (B) Construct the sub-task of the task through step n+1.
  (C) Identify and record the occurrences of the n+1 sub-task from (B). in the sessions being analyzed according to the task identification parameters.
  (D) Identify and record the occurrences of the n sub-task from a. in the sessions being analyzed according to the task identification parameters.
  (E) For any occurrence from d. that did not occur in (C):
    (1) Create a record for the path of length equal to the original task steps that matched the occurrence if a record doesn't exist already, and add it to the list of related task records for that n.
    (2) Increment the count of the path record.
  (F) Sort the list of related task path records for step n by decreasing occurrence count.

For the example task T:

---
T:  P1  P2  P3  P4
The most closely related tasks T' would be of the form
T':  P1  P2  P3  <any page other than P4>
---

Task Insight Engine

Further insight into visitor behavior regarding a task is gained by comparing and contrasting different populations of visitors that perform a task. A Task Insight Engine provides a mechanism to compute and evaluate characteristics of visits that completed a particular step and continued to the next step versus those that completed a particular step and departed. By examining this data and presenting it to the user, the present invention allows site designers to improve task efficiency.

Task Insight is computed and presented for each step of the task in the following categories:

TABLE 4

| Category | Available Insight Data for Comparisons |
| --- | --- |
| Visitor | Identity (e.g. IP address, cookie, etc.), geography (country, region (state/province), metropolitan area), repeat or single visit visitor, platform (web browser, operating system) of visitors. |
| Visit | Page views, page hits, click-ins, click-aways, avg. session length, avg. session duration, avg. page viewing time. |
| Task Behavior | Task statistics including starts, completions thru step, visits that started, visits that completed thru step, avg. starts per visit, avg. completions thru step per visit, avg. clicks to complete thru step, task efficiency (avg. clicks to complete thru step/number of steps), avg. time to complete thru step, task started first in visit, avg. page views before start, avg. time before start, avg. pages per step. |
| Page | Most visited pages, least visited pages, pages visited in common, most pages visited not in common, click-in pages, click-away pages. These pages are not necessarily part of the task but were visited often by the visitors in the population for the particular step of the task being examined. |

Further, insight data is examined for particular anomalies. These anomalies are presented to the user and the information is used by a Task Rule Engine to make recommendations for improving the performance of the task.

Task Insight Algorithm

The present invention further comprises a task insight algorithm. The task insight algorithm includes the following steps:

(I) For each step in the task:
  (A) Construct a "completed thru" sub-task containing all the steps in the task up to and including the current step.
  (B) Construct a "departed after" sub-task equivalent to the "completed thru" sub-task but not containing the next task step.
  (C) Construct a "continued" sub-task equivalent to the "completed thru" sub-task plus the next step in the task (if there is one).
  (D) From the set of sessions being analyzed, construct the set of sessions that "completed thru" the step by identifying all sessions that have at least one occurrence completing the "completed thru" sub-task from (A).
  (E) From the set of sessions being analyzed, construct the set of sessions that "departed after" the step by identifying all sessions that have at least one occurrence completing the "departed after" sub-task from (B).
  (F) From the set of sessions being analyzed, construct the set of sessions that "continued" to the next step by identifying all sessions that have at least one occurrence completing the "continued" sub-task from (C).
  (G) Using the set of sessions that "completed thru" the step, create task statistic data for the "completed thru" sub-task at the step being examined.
  (H) Using the set of sessions that "departed after" the step, create task statistic data for the "departed after" sub-task at the step being examined.
  (I) Using the set of sessions that "continued" to the next step, create task statistic data for the "continued" sub-task at the step being examined.
  (J) Create session data (visit and visitor statistics) for the set of sessions that "completed thru" the step.
  (K) Create session data (visit and visitor statistics) for the set of sessions that "departed after" the step.
  (L) Create session data (visit and visitor statistics) for the set of sessions that "continued" to the next step.
  (M) Compare the "departed after" and the "continued" task statistics. Identify anomalies for statistics where the averages plus or minus the standard deviations do not overlap.
  (N) Compare the "departed after" and the "continued" session visit statistics. Identify anomalies for statistics where the averages are plus the standard deviations do not overlap.

(O) Compile the page insight using the session data visit statistics, including most visited common pages, most visited pages not in common, etc.

Task Rule Engine

Generally, site designers want to increase the performance of a task by increasing the completed count and increasing task efficiency. However, recommendations for the task analysis are dependent on the type of task the user has specified. Some tasks may want to maximize the time spent or only require the task to be performed once per visit.

The present invention detects anomalies in visitor behavior related to tasks such as the following:
  Low utilization of links and pages that start the task
  Low utilization of links for completing the task
  High occurrences of exit from a particular stage
  Common exit pages to which visitors go in lieu of completing the task Additionally, anomalies from the Task Insight Engine are used. Anomalies are generated by Task Rules that execute given a task, task identification parameters, and a set of sessions to analyze. Once anomalies are detected, depending on the type and severity of the anomaly, the present invention makes recommendations for changes to the site structure to address the problem. These recommendations might be to add a link to the start of the task to a page more frequently visited than the current referring page, or to promote a link to the next step in a task because visitors seem to be distracted by another link away from a task.

Task Rule Algorithm

The present invention further comprises a task rule algorithm. The process of executing the Task Rule Engine is broken down into the following phases:

(I) Anomaly Generation. During this phase Rules that are designed to find specific Anomalies are executed given a task, task identification parameters, and a set of sessions to analyze. Additionally, Anomalies are created using the Task Insight Engine data.

(II) Finding Generation. Finding Generation clusters and further analyzes the Anomalies to generate Findings for particular pairs and sets of pages in the site. A Finding has a set of Anomalies and a priority based on the number and severity of the Anomalies.

(III) Recommendation Generation. Recommendations regarding changes to the site structure to improve the task performance are created where possible. Generic "needs investigation" Recommendations are created for Findings that no other Recommendation can be made. A Recommendation has a set of Findings and a priority based on the number and priority of the Findings, as well as the confidence in the Recommendation.

(IV) Recommendation Filtering. During Recommendation filtering, related Recommendations are combined, conflicting Recommendations are removed, and weak Recommendations are discarded.

Dominant Task Discovery

It is invaluable for a web site designer and operator to know the most common tasks performed by site visitors. The present invention can quickly discover dominant tasks related to a page, can help a user identify common tasks using visual presentations, and can automatically detect dominant paths.

Dominant, or most commonly occurring, tasks related to a page of interest can be identified automatically by the present invention. A focal page of interest can be selected by the user or automatically by the invention. In the former, the user identifies a page via the present invention's GUI. For example, selecting a page in the visual Site Map viewer. Additionally, the user indicates whether or not the dominant tasks should be incoming (end with the page), outgoing (start with the page), or intermediate (in the middle of the task). Finally, the user specifies the length of the task they are interested in, i.e. the number of clicks in the resulting path.

As part of a report, dominant paths are automatically discovered into and out of the most frequently visited pages of the site. The number of top paths identified for each page, the number of top pages for which paths are identified, and the length in steps (clicks) of the tasks are all configurable by the user as input to the software comprising the invention.

Algorithm for Finding the Dominant Page-Related Tasks

The present invention further comprises an algorithm for detecting dominant tasks for a focal page including the following steps:

(I) Input includes focal page, task length, and direction of task with respect to the focal page (incoming, outgoing, intermediate) and the set of sessions to analyze.

(II) Construct a task with a single step consisting of the focal page.

(III) If the direction is outgoing, append a number of wildcard steps to the task equal to the length of the task requested minus 1. A wildcard step matches one and only one of any page in the site.

(IV) If the direction is incoming, insert at the beginning of the task a number of wildcard steps to the task equal to the length of the task requested minus 1.

(V) If the direction is intermediate, insert at the beginning and append to the end of the task an equal number of wildcard steps such that the task length matches the requested task length. For intermediate the task length is rounded to the nearest odd number greater than the requested length.

(VI) Perform the task path analysis as described in the "Task Identification Algorithm" for direct completion and "match all not overlapping" of the focal page task created in (I)-(V) and the set of sessions to analyze. The resulting paths are the dominant paths for the focal page that meet the input criteria.

Visual Task Detection

The process of automatically detecting dominant tasks without a focal page is extremely compute intensive. Because the human brain handles abstract thinking much better than a computer, the present invention incorporates visual displays of the site visits that allow users to notice patterns visually. These patterns are repeated visitor tasks, i.e. dominant tasks.

A Visit Tracker display shows the visits to a site sequentially (not interleaved) in the form of an event trace diagram or interaction diagram common in software design methodologies. Each column represents a page or a user-defined group of pages. Each row includes a line from one page to another representing the fact that a visitor went from the source page to the destination page.

Using the Visit Tracker display a user can easily identify visual patterns and zoom in to locate visitor behavior patterns of interest. The Visit Tracker allows a user to select a sequence of pages and define them as a task. This task can be analyzed as described in previous sections to access all of the information regarding the task.

Algorithm for Automatic Task Detection

Automated task detection starts with dominant paths out of the most visited page and works through other paths to determine the most dominant task of a particular length. The algorithm is as follows:

(I) For each candidate task length 2 through the maximum candidate task length being discovered.
   (A) Initialize the page hit threshold to 1
   (B) Initialize the most dominant task of this length to null and the occurrence count to 0
   (C) For each page from the most visited (most hits) to the least visited page with hits greater than or equal to the page hit threshold
      (1) Construct a task with a single step consisting of the current page
      (2) Append a number of wildcard steps to the task equal to the candidate task length minus 1. A wildcard step matches one and only one of any page in the site.
      (3) Perform the task path analysis as described in the Task Identification Algorithm for direct completion of the task in the set of sessions to analyze.
      (4) If the most dominant path returned occurs more than the current occurrence count:
         (i) Set the most dominant task of the current length to the current dominant path
         (ii) Set the occurrence count to the count of the current dominant path
         (iii) Set the page hit threshold to the occurrence count Filtering Sessions Using Tasks Part of creating a report including site traffic, visitor behavior, and recommendations is choosing the set of sessions to include in the report. The present invention incorporates a visit filter allows a user to filter the original set of sessions constructed from the site logs. One of the filters that can be used is a task filter. With it the user can choose sessions that participated in a task as follows:

Completed a task
Didn't complete a task
Started a task
Started but didn't complete a task The filter can combine any number of tasks together, e.g. the filter includes sessions that completed task A but didn't complete task B. Additionally, task referral and next pages can be specified for each task. For example, include sessions that completed task A and started task A from page P2 and went to page P5 after they completed the task.

Task Editor

The Task Editor panel allows the user to define a visitor task. For example, if a user is interested in seeing how visitors browse their site's employment pages and when or how they react those employment pages the user can define a visitor task for how visitors navigate employment pages. The user can define any number of steps for each task as well as any number of pages per step in Task Editor.

Figure 2:
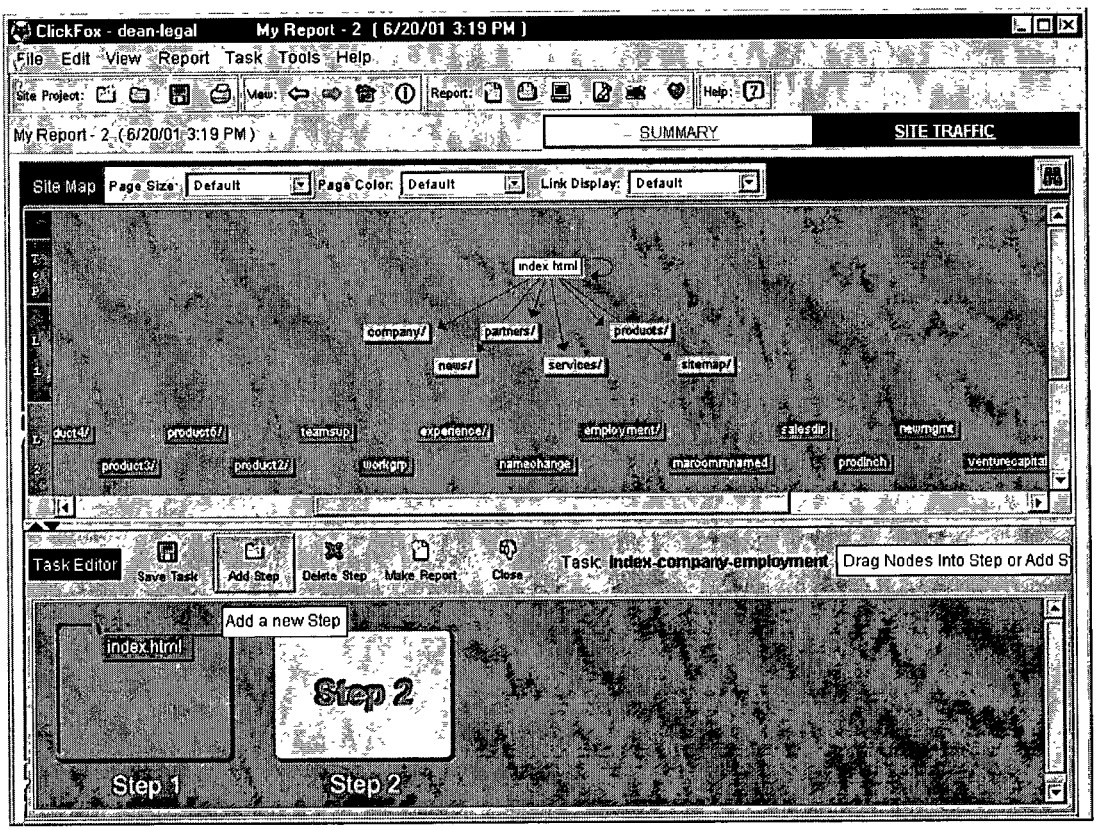
FIG. 2 is an application with main menu, toolbar, report label and menu, Site Map viewer, and Task Editor display at bottom.
Figure 3:
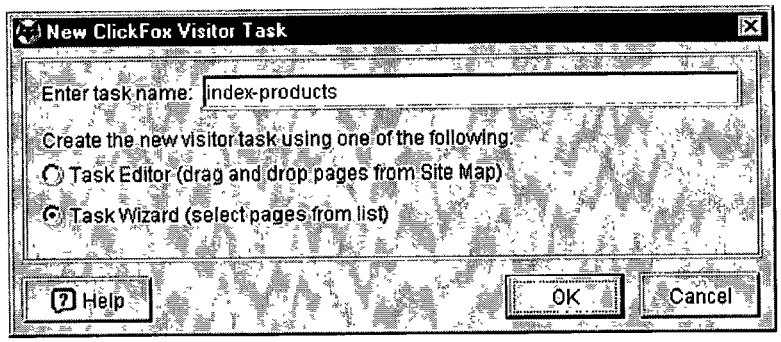
FIG. 3 is a new task dialog to create a task using the Task Wizard.
Figure 4:
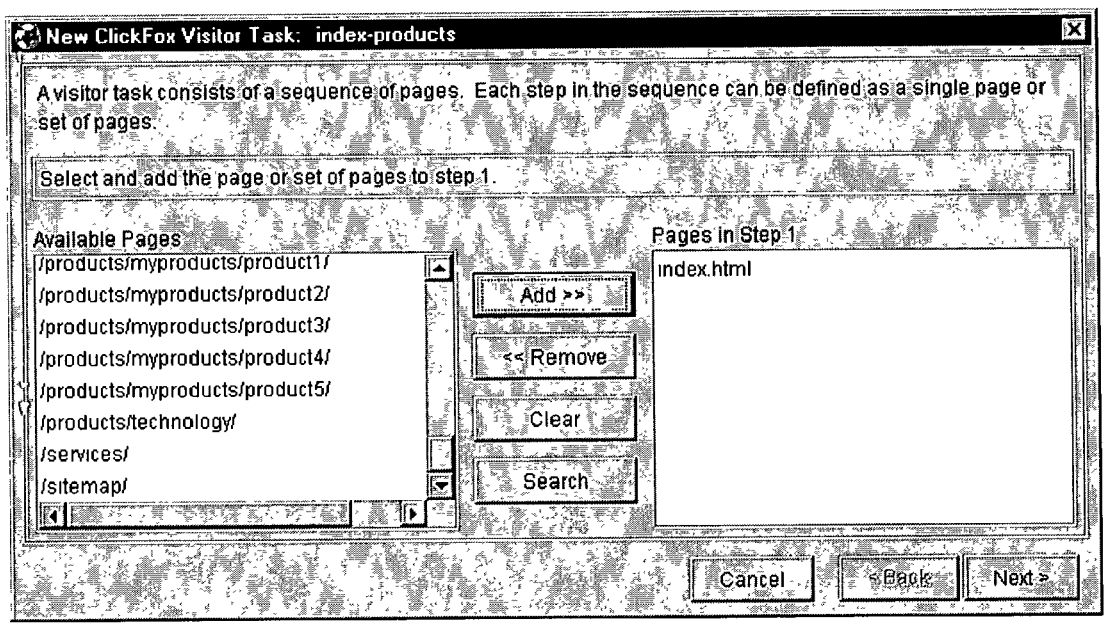
FIG. 4 is a Task Wizard panel to define a task step by adding pages.
Figure 5:
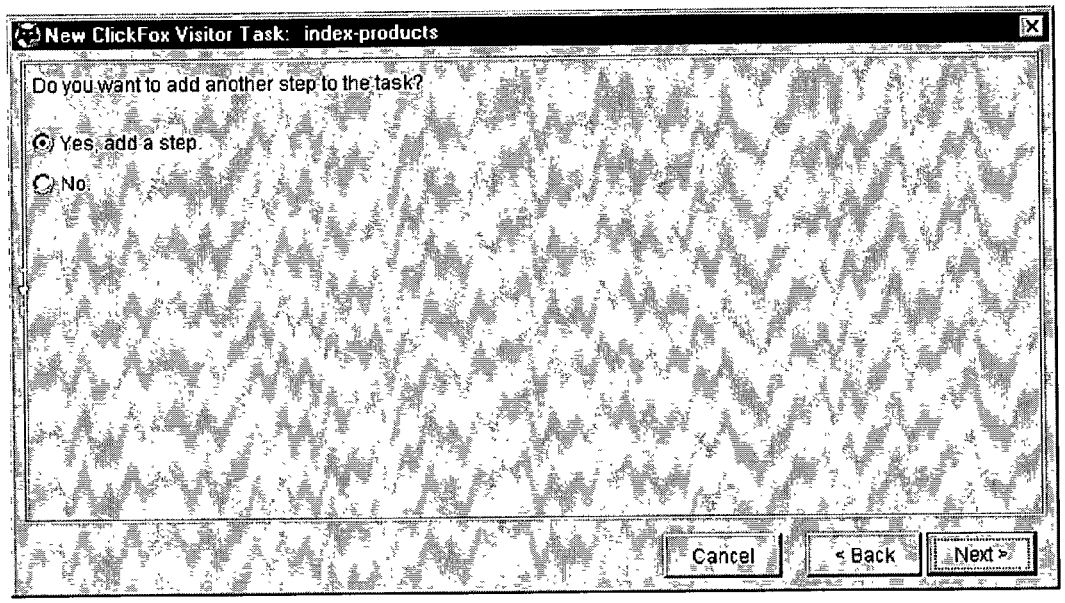
FIG. 5 is a Task Wizard panel prompting if another step is to be added.
Figure 6:
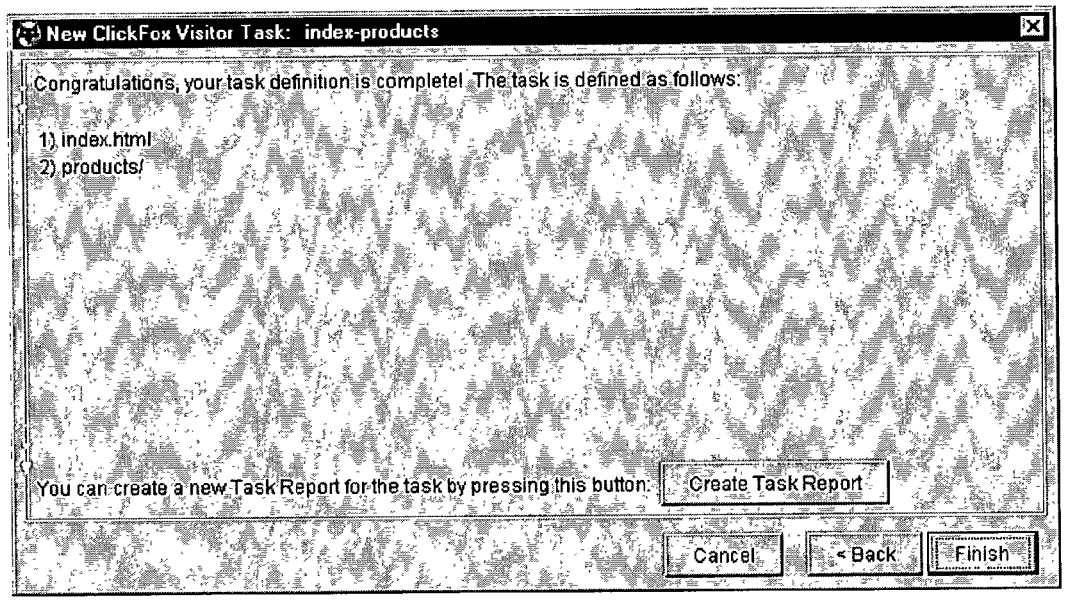
FIG. 6 is a Task Wizard final panel.

The Task Editor is activated when a user wishes to define a new task or edit an existing task. When defining a new task the dialog shown in FIG. 1 appears and the user enters the task name. Then the Task Editor is opened and it appears at the bottom of the present invention application window underneath the Site Map viewer (FIG. 2). The Task Editor UI includes a header with the task name and toolbar controls for creating a new task, opening an existing task, saving the task, adding a step to the task, and removing a step.

The main part of the Task Editor display is the graphical representation of the task as a sequence of folders, where each folder represents a step in the task. Pages can be dragged and dropped using the mouse from the Site Map into the folders. Pages that are part of the step are displayed in the folder, when clicking on it with the left mouse button or when a new page is dropped into the folder it opens. Each folder can be given a name by the user. Feedback in the form of icons is provided while the user is dragging as to whether a page already exists in a step, or whether it is permissible to drop the page.

Task Wizard

The Task Wizard as shown in FIGS. 3-6 is a UI wizard for the definition of a task. It displays a sequence of panels that allow the user to define the pages in each step of the task as shown. At the end the user can immediately launch a task report.

New Report Dialog

Figure 7:
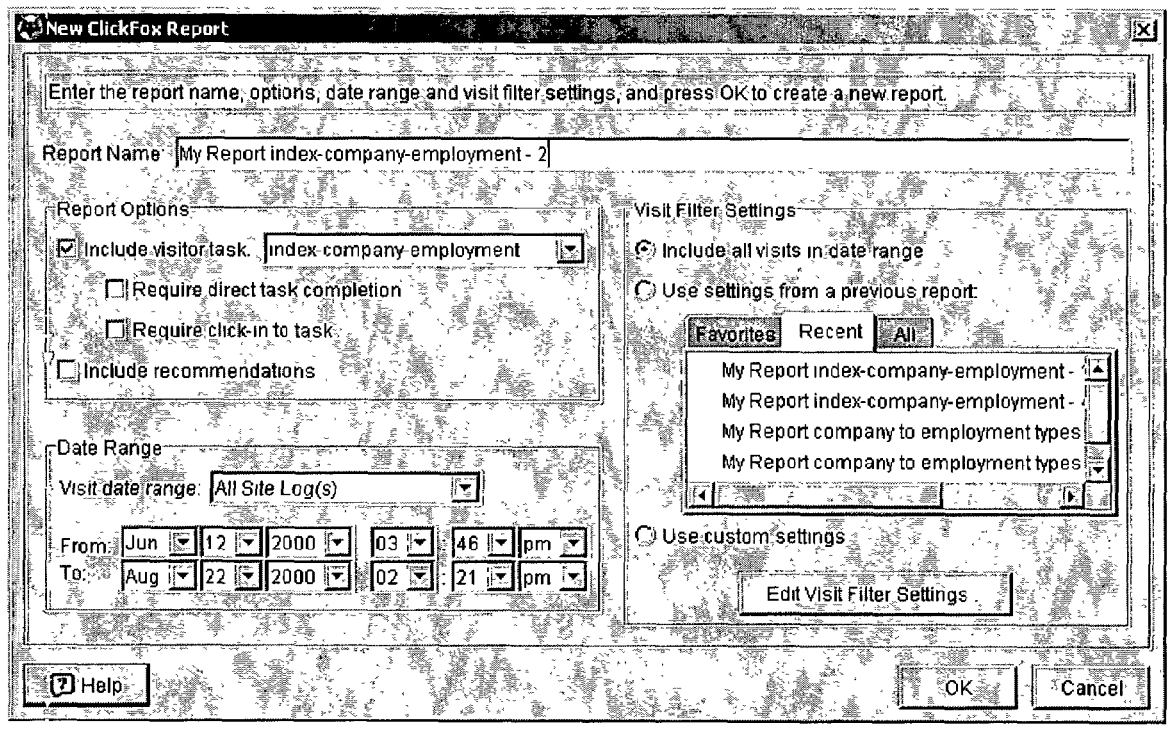
FIG. 7 is a New Report Dialog to define a report with various task analysis parameters and visit filtering.

The New Report Dialog shown in FIG. 7 is the interface for defining a new report that the user wishes the invention to create. The user can specify a task to analyze, chosen from a pull-down menu of already defined tasks, and if the task analysis is to require direct completion and is to require click-in to a task or require click-away after a task. These are the default task analysis options presented to the user, although more advanced options are supported by the software and are part of an advanced UI not shown. Also selected are whether or not the user wants recommendations to be generated, and the date range of visits to include in the report. Finally the user can edit visit filters to filter which of the visits within the date range are included.

Each report can focus on a particular group or population of visitors. The specific group to be analyzed can be "filtered" from the set of all visitors by such criteria as geography, behavior and demographics, (e.g., date and time of access, country of origin, pages visited, tasks performed, and more). Statistics and recommendations included in the report will reflect only visits and visitors that meet the criteria. This is an important tool for segmenting and profiling visitor population.

For example, the present invention allows the time of day, and a minimum and/or maximum visit duration that a particular visit must meet to be included in the report. Specific click-in pages, or pages where visitors enter the site, click-away pages, or pages where visitors leave the site, and referral sites can be defined as parameters as well. A group of pages a visitor must have visited or must not have visited can also be specified. Visitor demographics such as country, region, and metropolitan area can be filtered. The user can also select whether unique (i.e., visited the site only once during the relevant time period) and/or repeat visitors are included in the report. The platform used by the browser, including the web browser and operating system, can also be filtered.

Figure 8:
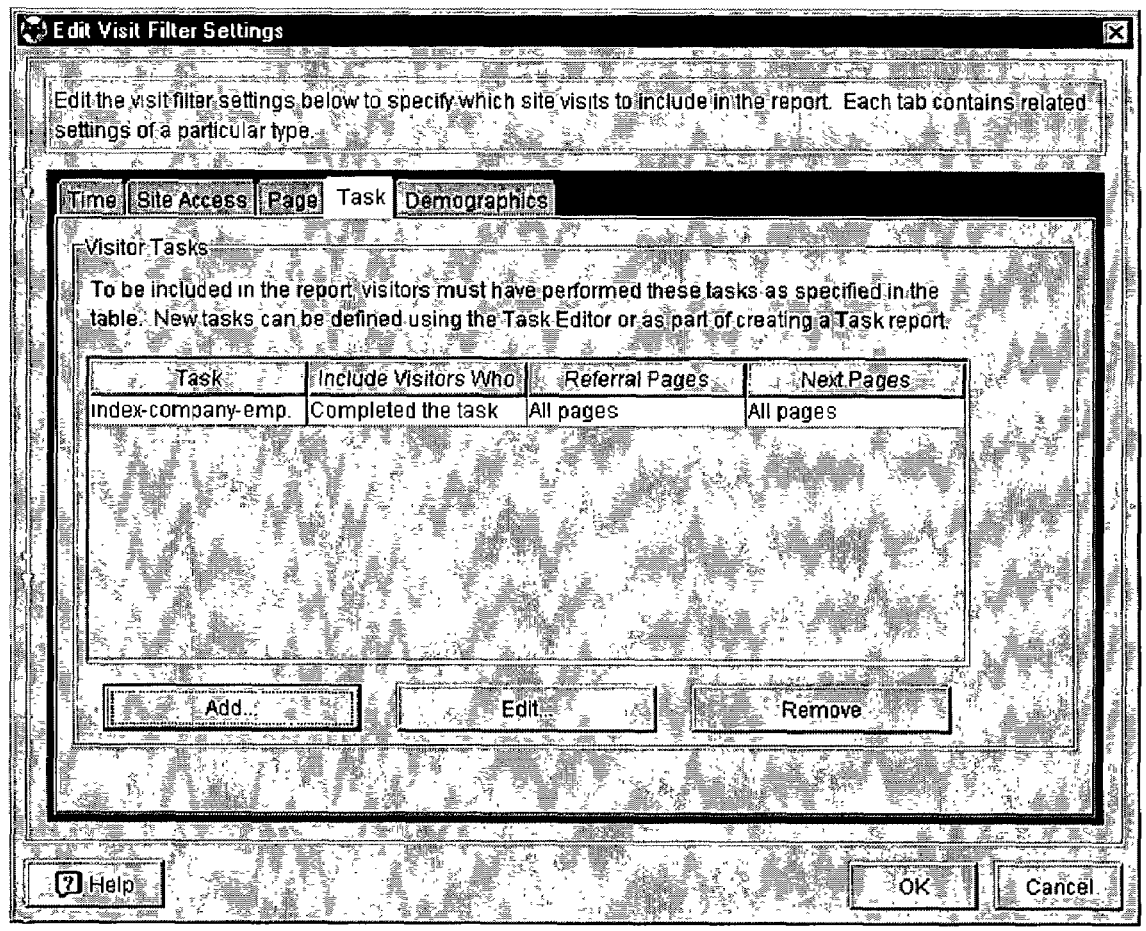
FIG. 8 is an Edit Visit Filter Settings dialog showing task visit filter tab panel selected.
Figure 9:
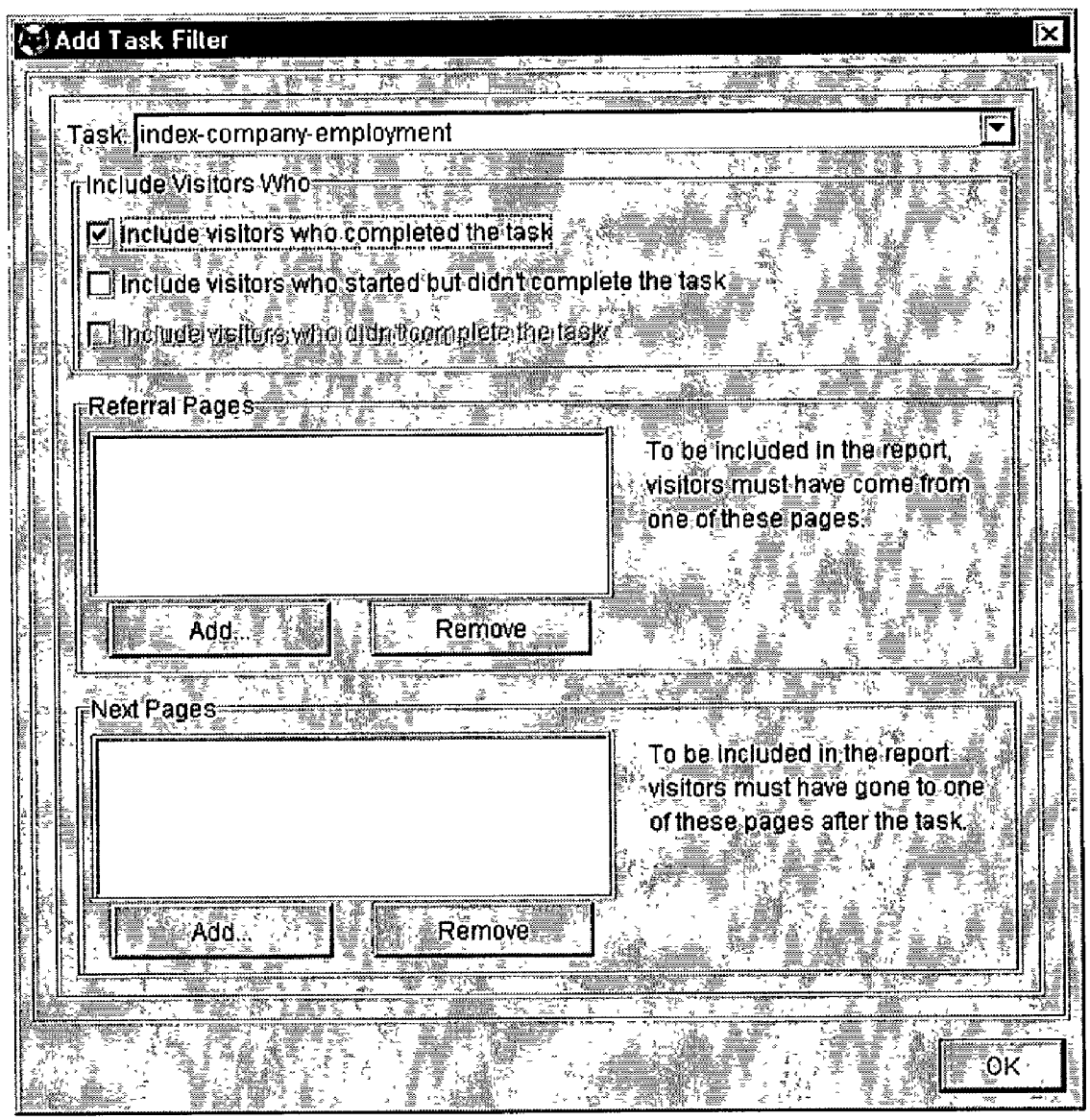
FIG. 9 is an Add Task Filter to the task visit filter panel of the Edit Visit Filter Settings.

If the user chooses to edit the visit filters for the report, one of the filters they can define is the task visit filter shown in FIGS. 8-9. As mentioned previously the user can filter visits that participated in a set of tasks in the specified ways and possibly included particular referral and next pages.

Report Summary Display

Figure 10:
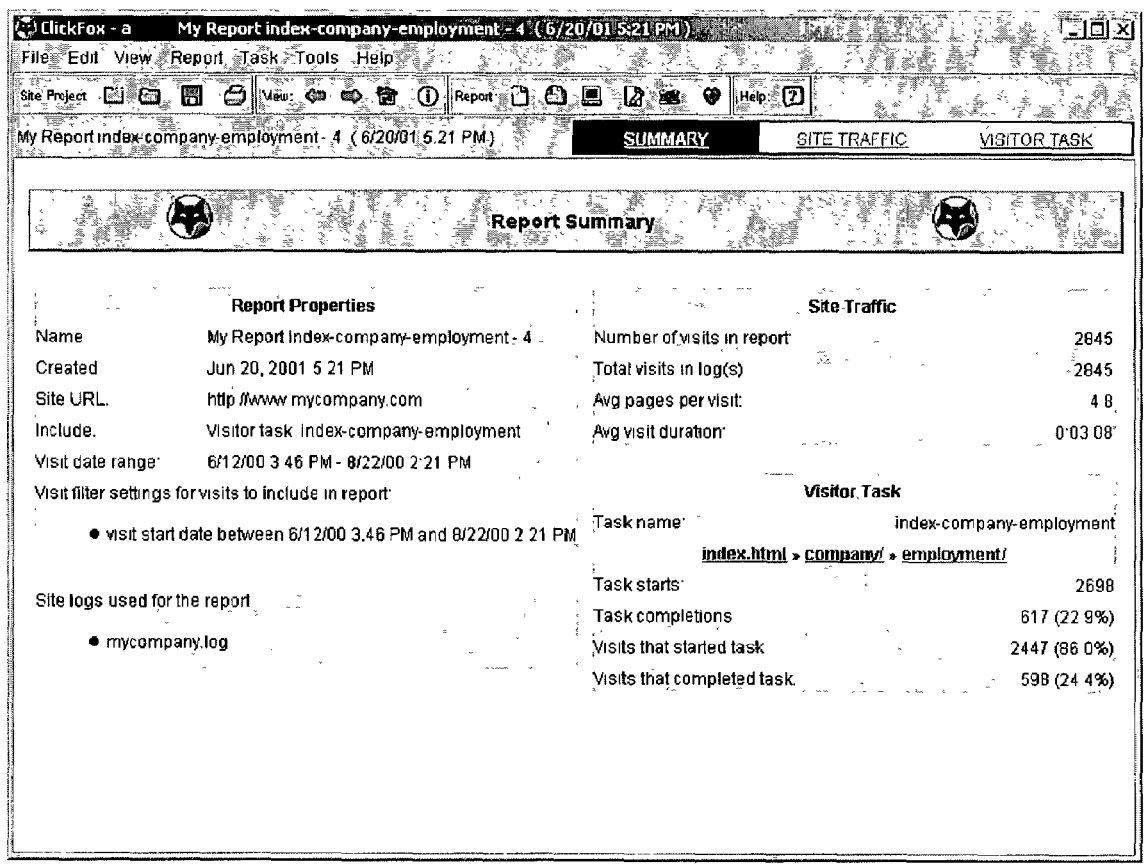
FIG. 10 is an application showing the Report Summary for a particular report including visitor site traffic and visitor task results.

After the creation a report for the user, the Report Summary page is presented as shown in FIG. 10. If the report includes a task analysis then the name of the task, the task analysis parameters, the task itself, and a high level summary of the task statistics is provided.

Task Overview

Figure 11:
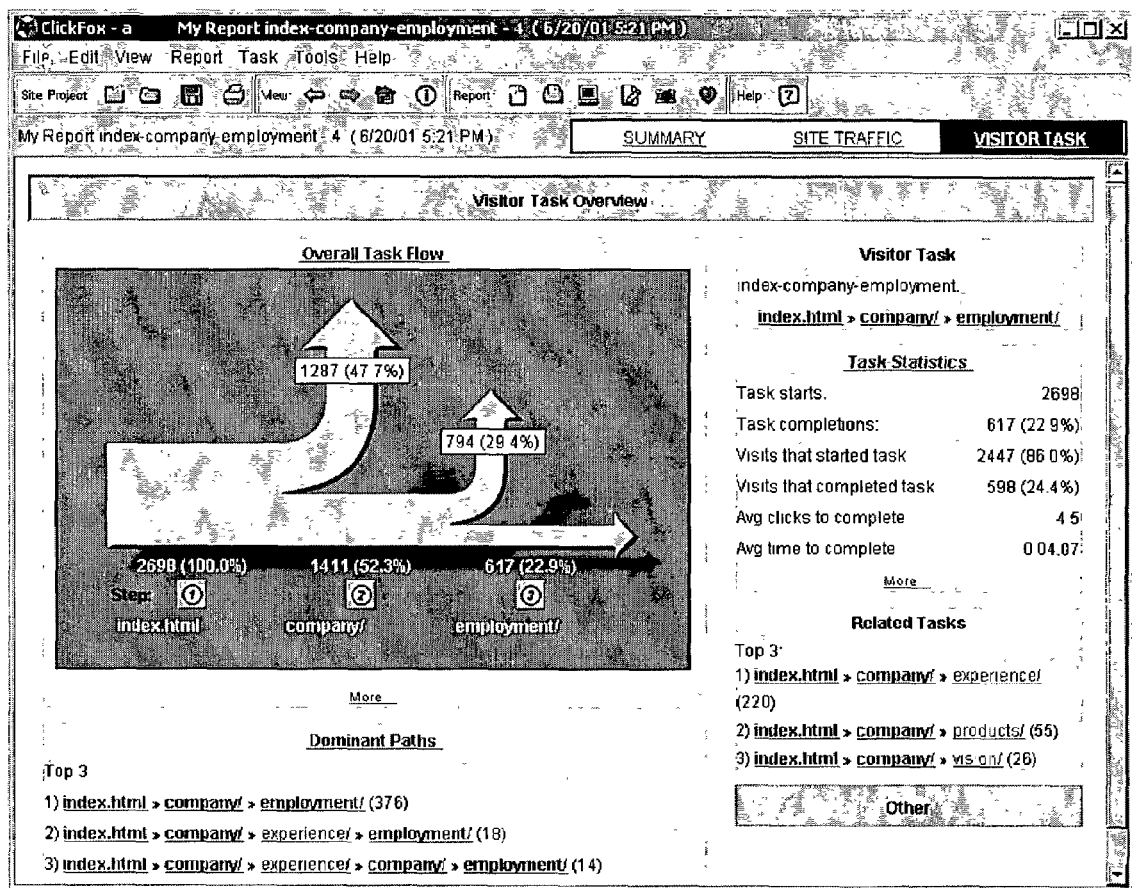
FIG. 11 is an application showing Task Overview for a particular report showing task flow, task statistics, dominant task paths, and related tasks
Figure 12:
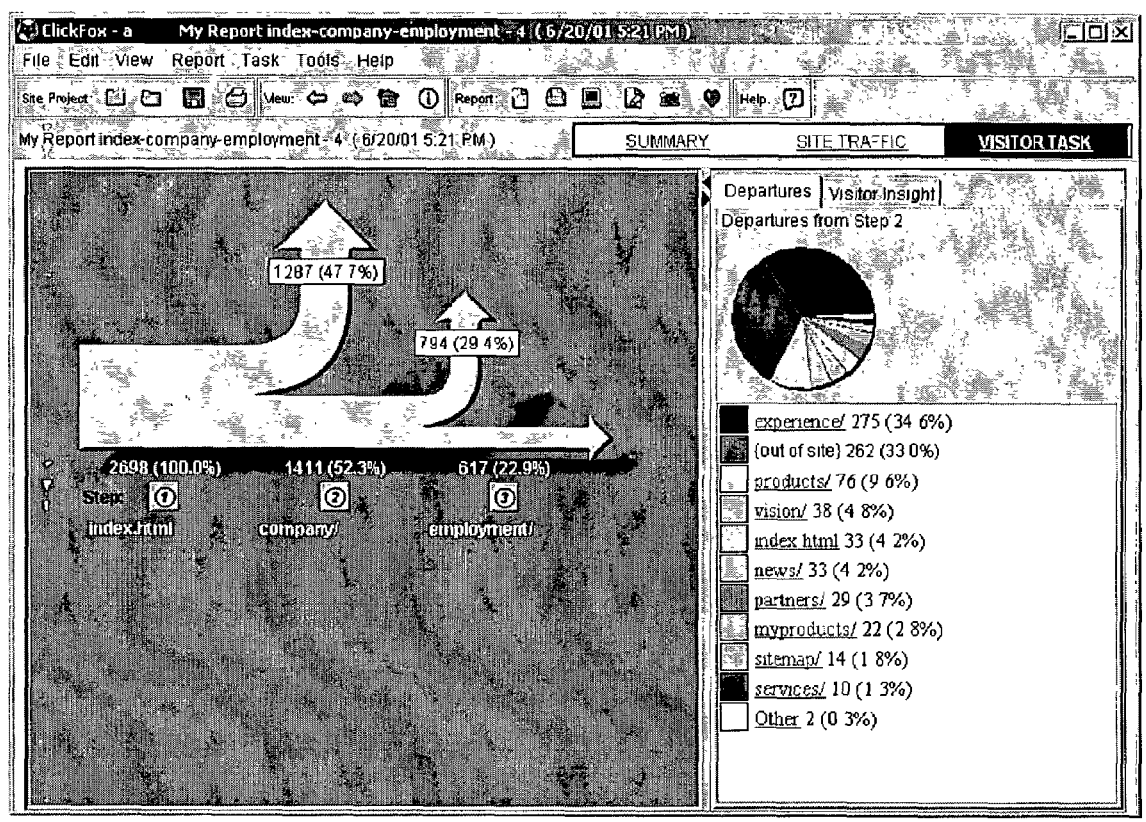
FIG. 12 is an application showing Task Flow with Departures for Step 2 for a particular report.

The Task Overview of FIG. 11 is available from the main report menu (by clicking "Visitor Task") when a task report is created. It includes several sections that provide an overview of the task statistics, visitor behavior through the tasks, task recommendations, and related tasks. Each of the titled areas is a link to a display specific to that section. For example, left-clicking on the link labeled "Overall Task Flow" takes the user to a Task Flow display shown in FIG. 12, and clicking on the "Dominant Paths" link takes the user to the Task Dominant Paths display shown in FIG. 14. The Task Overview panel provides an extremely powerful way for user to get an overview of the task analysis results. FIG. 11 shows the various components of the panel.

The Visitor Task area is a component that lists the name of the current task as well as the pages that comprise it. Task Statistics is a table that provides a listing of high-level, important task statistics for the current task. For example, it is possible to inspect highlights of the available task statistics such as the number of visitors that started a task, the number of visitors that completed the task, etc. The Task Flow part displays a graphical representation of how visitors travel through the various pages of this task. It shows user the relative number of visitors that completed the task as well as the number that did not and at which point each group departed. Each step is represented by an arrow. The thickness represents the relative number of total visitors for each step. Clicking on the title of the pane or the task flow image, "Task Flow" opens the full Task Flow display shown in FIG. 12. Related Tasks is a table that provides a listing of tasks and the associated pages that comprise them that are related to the task being examined. The user can see pages listed that the present invention identified as being similar to the ones included in the current task.

Dominant Paths is a table that provides a listing of the pages and various combinations of the task that were found in site visitors' navigation patterns. Clicking on the title of the pane, "Dominant Paths" opens the full Dominant Paths display of FIG. 14.

Task Flow Display

The Task Flow display (FIGS. 12-13) is a visual representation of the cumulative visitor traffic through the steps of the task. The thickness of the arrow-lines represent the amount of visitors that either remained in the task or departed from the task after each step.

Amount and percentages of remaining visitors in the task are shown as labels underneath the graphical flow. Additionally there are labels for each step in the task and the names of the pages that are defined as part of each step.

The user can click a particular arrow or the step button using the left mouse button and further information about the visitors is displayed in a set of tab panels on the right. For example, selecting a departure arrow from a particular step will display the Departures tab for that step. This tab has a pie graph showing the pages that the visitors departed to and the number of visitors that went to each page. Each page label in blue is a link that can be clicked to display the actual page in the user's default web browser. The "Other" label can be clicked and opens a pop-up window with a pie graph and list of all the remaining departure pages that aren't visible in the first pie chart.

Figure 13:
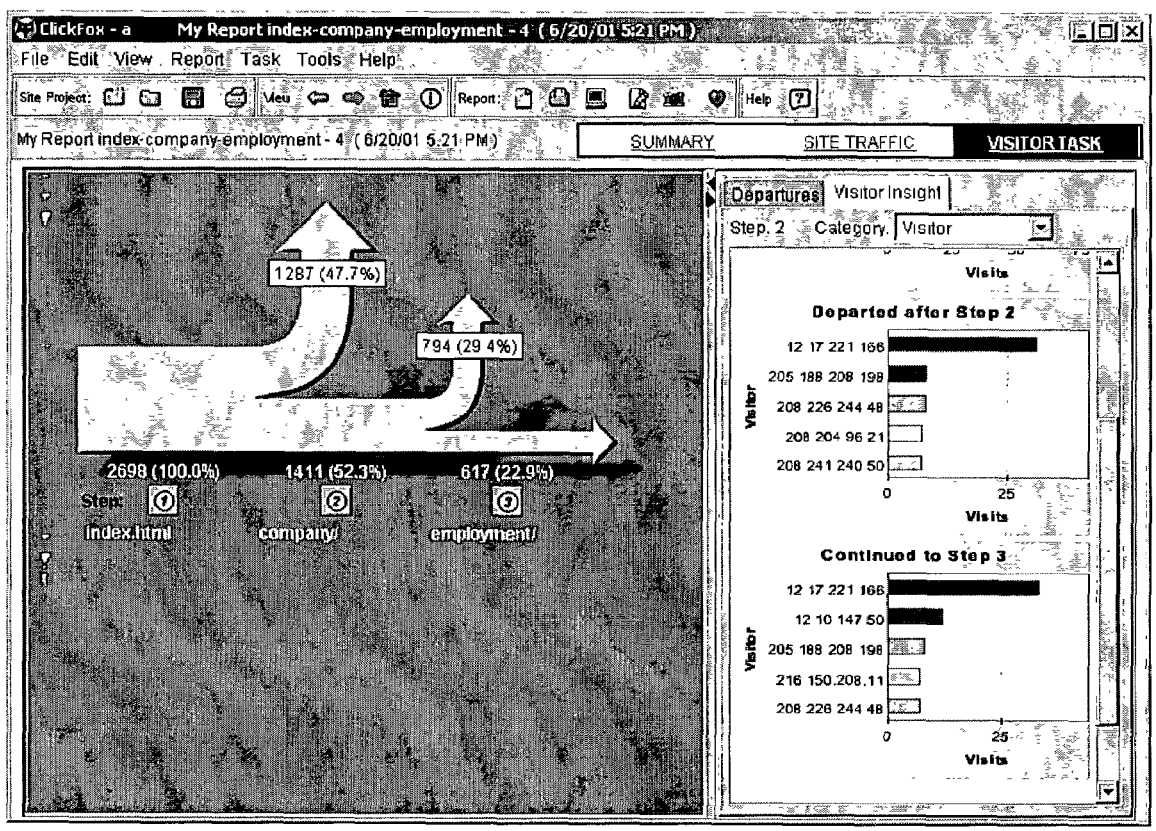
FIG. 13 is an application showing Task Flow with Visitor Insight in the visitors category for Step 2, for a particular report.

The Visitor Insight tab shows the visitor insight data and results for the selected step. The category option menu allows the user to choose which category of insight to display: Visit, Visitor, Task, or Page. Each category includes charts showing the appropriate results. Charts for the top or most of a particular data can be configured to contain the top "n" number of items by the user. For example, the visitor category shown in FIG. 13 shows charts for the top visitors' identity (IP address or DNS hostname) and count that completed step two, departed after step two, and continued to step three. The following table identifies some of the charts available in each category.

TABLE 5

| Category | Available Insight Charts |
| --- | --- |
| Visitor | Top visitors by identity (e.g. IP address or host, cookie, etc.), top countries, top geographic regions (state/province), top metropolitan areas, count of repeat vs. single visit visitors, top web browsers, top operating systems of visitors. |
| Visit | Number of page views, page hits, click-in pages, click-away pages, avg. session length, avg. session duration, avg. page viewing time. |
| Task Behavior | Task statistics including starts, completions thru step, visits that started, visits that completed thru step, avg. starts per visit, avg. completions thru step per visit, avg. clicks to complete thru step, task efficiency (avg. clicks to complete thru step/number of steps), avg. time to complete thru step, task started first in visit, avg. page views before start, avg. time before start, avg. pages per step. Timeline of completions through the step and completions through the step by hour of day and day of week. |
| Page | Most visited pages, least visited pages, pages visited in common, most pages visited not in common, click-in pages, click-away pages. |

By comparing the charts and reading the anomalies identified by the Task Insight Engine, users can obtain knowledge about the population of visitors who is and isn't completing the task through certain steps.

Task Dominant Paths Display

Figure 14:
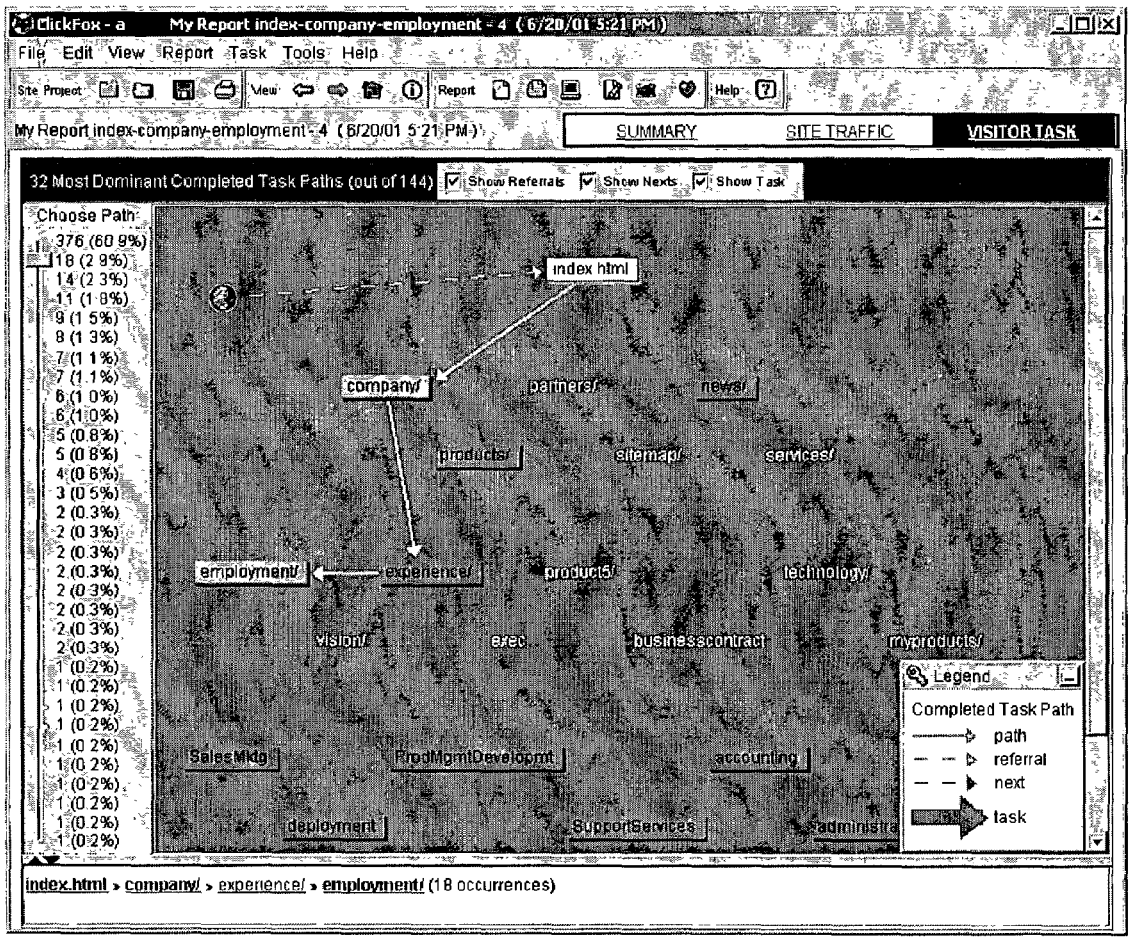
FIG. 14 is an application showing the Task Dominant Path display for a particular report.

The Task Dominant Path display in FIG. 14 allows the user to see the specific path in terms of pages visited that visitors took in performing the task. The view includes a highlighted rectangle object representing each page that was defined to be part of the task, and a label for other pages that are part of the paths that visitors took through the task (but aren't part of the task), laid out in a directed graph structure similar to the Site Map viewer. A world icon represents pages outside of the site project.

One path at a time is displayed on the screen as a sequence of arrows connecting the pages. A slider on the left labeled with the number of visitors who took a particular path allows the user to select which path is displayed. The paths are ordered by "dominance" in terms of the number of visitors performing them, from most dominant to least.

Each path is shown as a sequence of cyan arrows between the pages in the order they were visited. A feint thick, gray arrow line shows the shortest path through the task for reference. Check box controls at the top of the display allow the user to selectively display the following:

Referrals: when checked, show dashed orange arrow edges from the pages that referred visitors to the start of the task path being shown, including edge labels with the number of visitors coming from each referral page.

Nexts: when checked, show dashed magenta arrow edges to the next pages that visitors went to after completing the task path being shown, including edge labels with the number of visitors to each next page.

Animate: when checked, displays an animation of the path sequence. Each "frame" of the animation shows the next link taken by the visitors in the sequence as a thick line. In each subsequent frame that line becomes thinner, effectively creating a "tail" much like that of a comet that originates from the lead page in the frame. The lead page is also given a halo-like aura around it to highlight it for the user.

Task: when checked, the shortest path through the defined task is shown in a faint, thick arrow line.

Task Statistics Display

Figure 15:
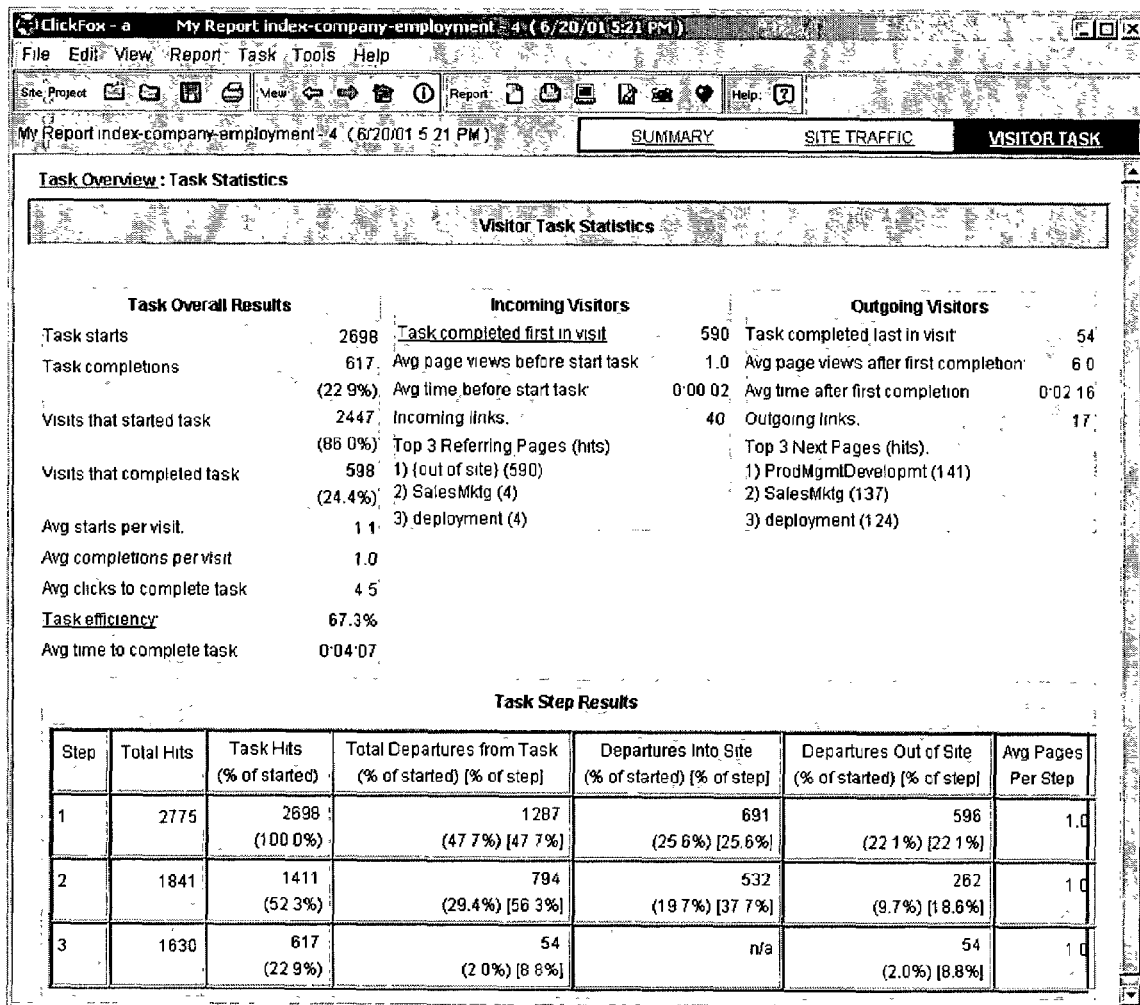
FIG. 15 is an application showing the Task Statistics display for a particular report.

All of the task statistics computed for the task are displayed in the Task Statistics view of FIG. 15. This view includes tables of overall statistics, incoming to the task statistics, outgoing from the task statistics, and step-based statistics. See Table 3 for a list and description of the task statistics.

Site Map Dominant Paths Display

Figure 16:
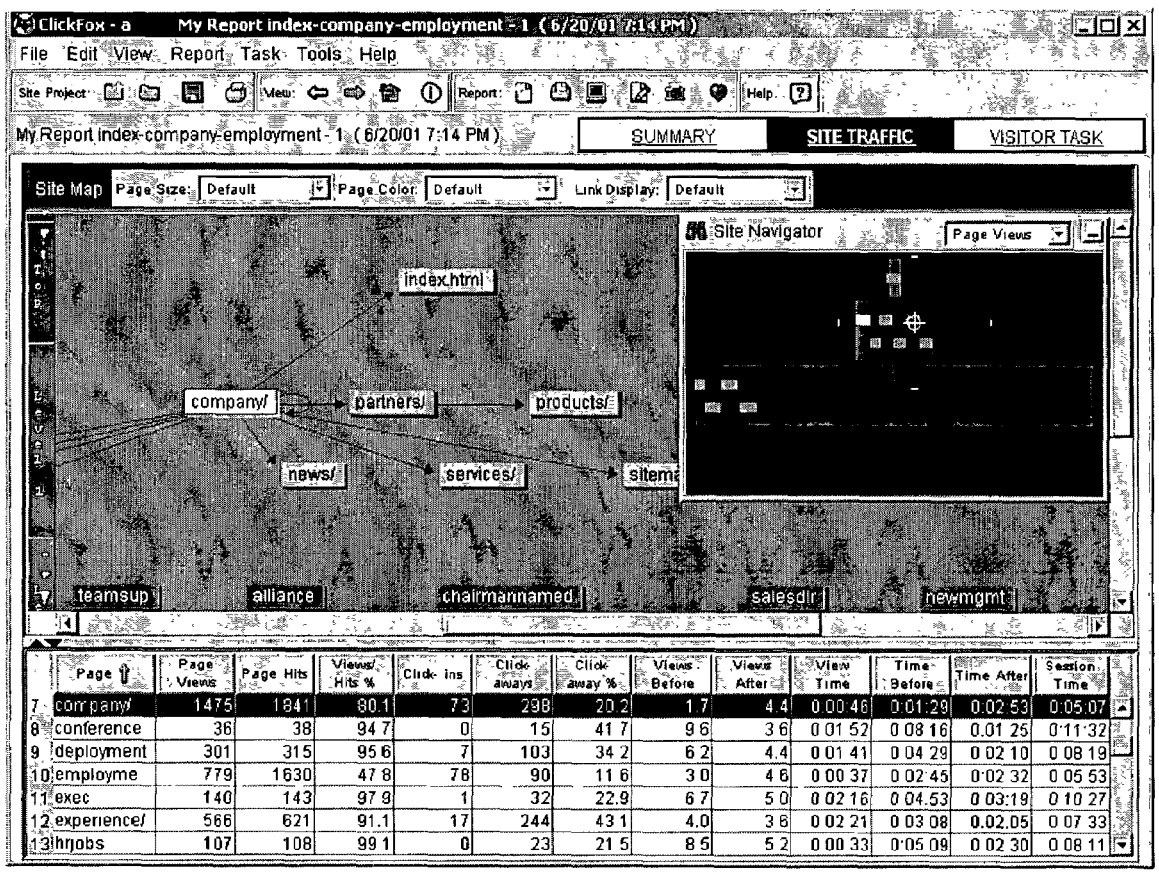
FIG. 16 is an application showing Site Map with Site Navigator global view in upper right for a particular report.

The Site Map viewer panel (FIG. 16) displays an interactive visual representation of the site project, including the pages (rectangles) and how each page is interconnected with the rest of the site (arrow lines). Towards the top of the panel is a set of controls that allow for expanded functionality. For example, by varying the Page Display selection the user can view various statistical measures like page viewing time or number of page views for each page as well as obtain an overall picture of how visitors are interacting with the site. These measures are color, shape, and line-style encoded in the display, with a legend describing for the user the meaning.

By clicking the left button of the mouse on a page object, the page and its links are highlighted. Users can then observe and manipulate different functions related to that page object. Links are the URL links among the pages. Links are graphically represented as straight lines between web pages. Links' graphical representations are reformed depending on various application selections or depending on context. For example, they can have arrows and can be painted in different colors depending on the Link Display options. The "more links" arrow icon shows the extent to which links are related to the page in question. For simplicity, the "more links" icon is used to inform user that there are more links related to that page than are currently shown in the display.

By clicking the right mouse button on the Site Map viewer panel, an option menu related to the links of the pages appears. Selecting each item on the menu varies the type of links that are displayed, such as highlighting outgoing links, highlighting incoming links, showing recommended links to add/remove, etc. Link display options are used to show the traffic flow through the links between pages and to show the dominant paths.

Figure 17:
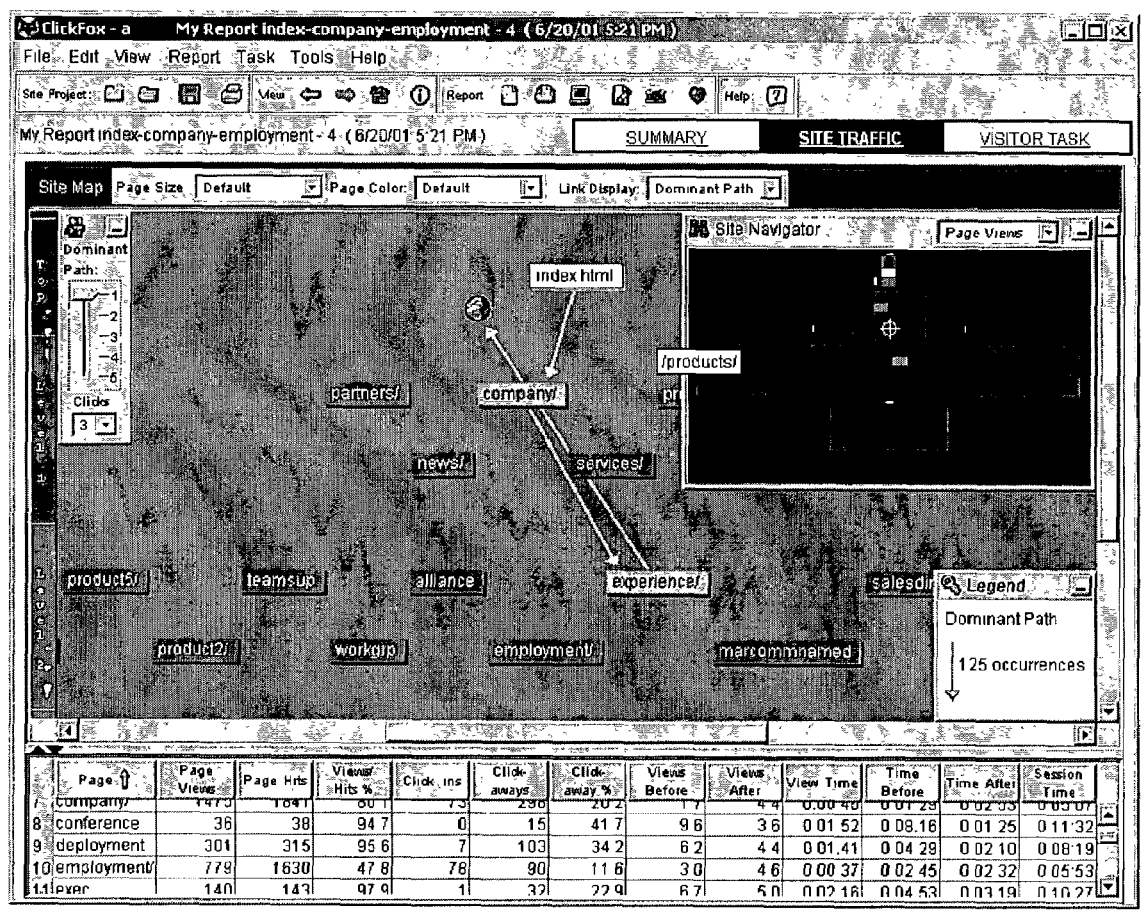
FIG. 17 is a Site Map with Link Display set to Dominant Path and Dominant Path control in upper left for a particular report.

The present invention can use color and thickness to encode various statistics such as the relative traffic on incoming or outgoing links (i.e. from and to a page). In FIG. 17, the Link Display is set to Dominant Path. In this mode, the selected page-related dominant path is shown, either incoming or outgoing depending on whether the incoming or outgoing link highlighting option is on. Controls on the left allow the user to choose which of the top five dominant paths for that page to display, and to set the number of clicks (the dominant task length) to display. Since in FIG. 17 the link highlighting is set to outgoing, the dominant path displayed is outgoing from the selected page. In this case the selected page is "index.html". The most dominant 3-click outgoing task (path) from "index.html" goes to "company/", then "employment/", and then departs the site.

Visit Tracker Display

Figure 18:
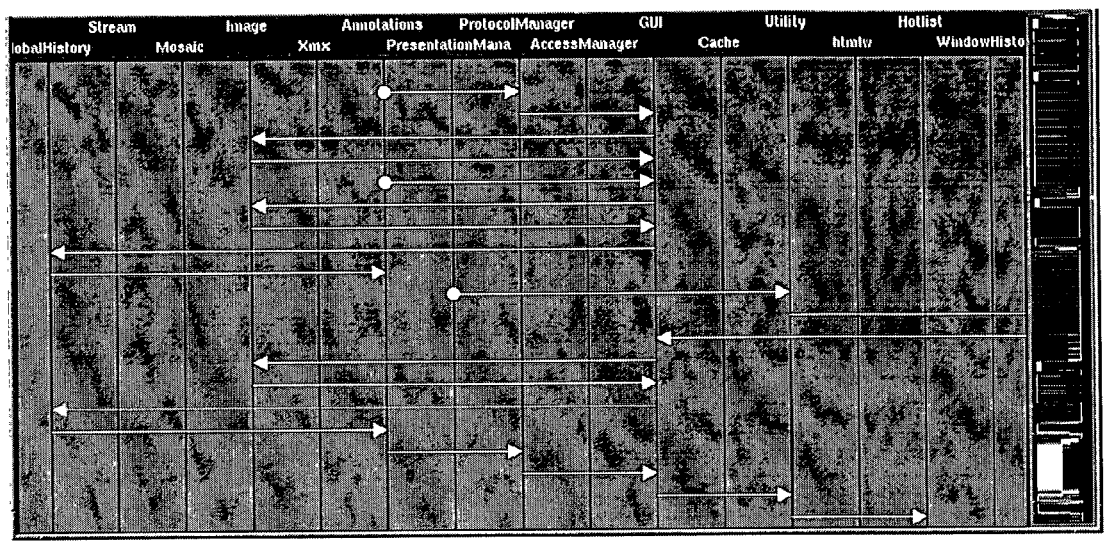
FIG. 18 is a Visit Tracker display of a set of visits to a web site for a particular report.

The Visit Tracker display of FIG. 18 shows the visits (sessions) to a site sequentially (not interleaved) in the form of an event trace diagram or interaction diagram common in software design methodologies. Each column represents a page or a user-defined group of pages. Each row includes an arrow line from one page to another representing the fact that a visitor went from the source page to the destination page, as in following a link. Arrow lines that begin with a circle indicate the beginning of a visit.

Figure 19:
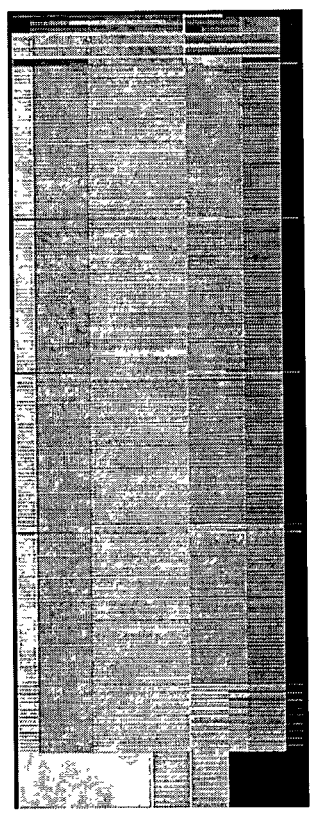
FIG. 19 is an Example Information Mural of a set of visits to a web site.
Figure 20:
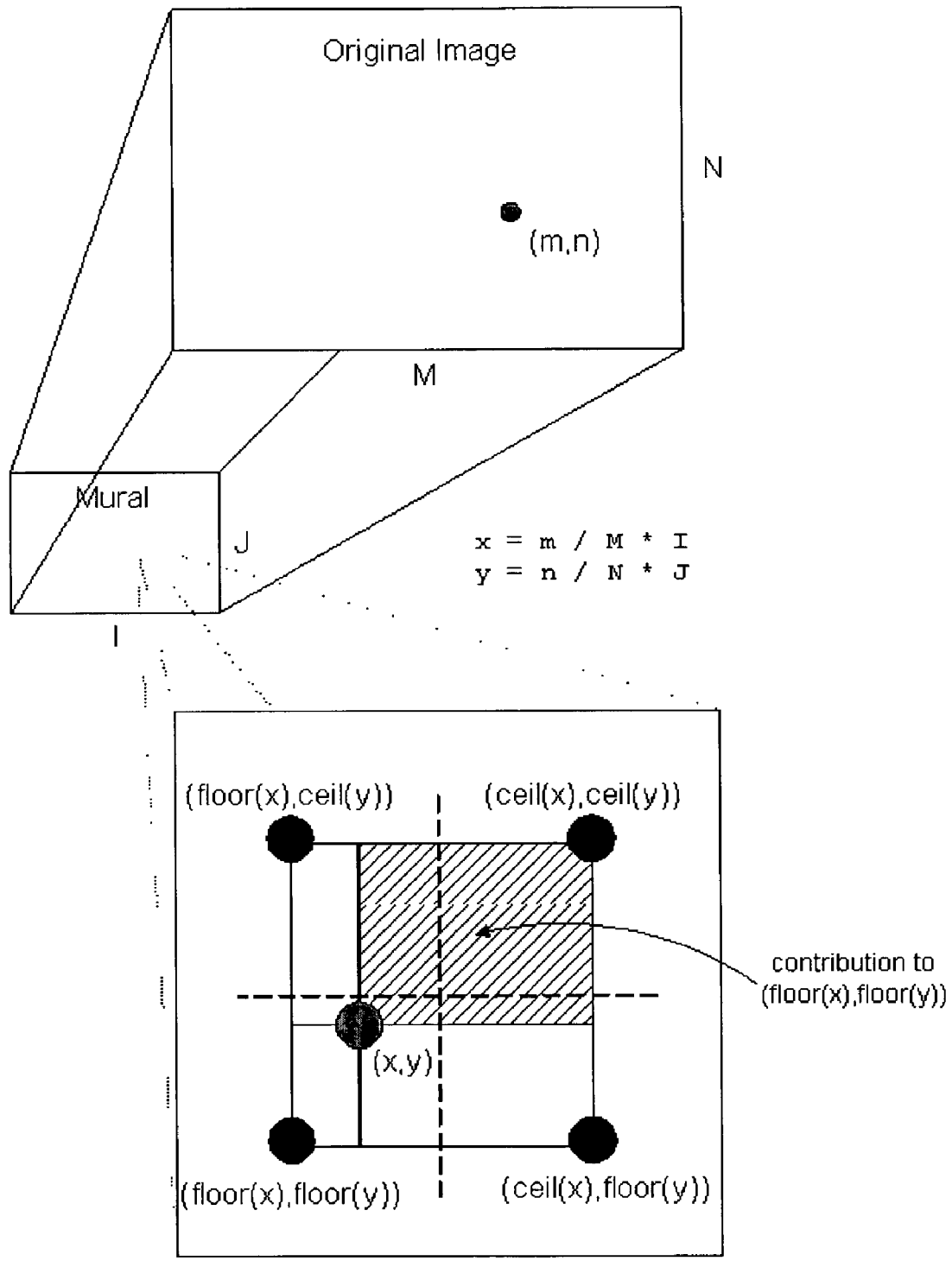
FIG. 20 is an Information Mural information compression technique.

The main detail area of the display shows the visitor "tracks" zoomed in. The area on the right shows an Information Mural (also shown in FIG. 19) of the entire set of visits—a global view. The Information Mural technique for creating global views of large information spaces is described in a Ph.D. Dissertation by Dean Jerding. The global view includes a "you are here" indicator, coloring on the border indicating where in the entire view the current detail area is located. An Information Mural compression techniques is illustrated in FIG. 20.

Each of the arrows represent either a physical link in the site or a "jump" link created when the visitor jumped from one page to another where there isn't a physical link. A link can be given a color and then that link will show up that color in both the detail view and the global view.

The sequential order of the visits can be set by the user to one of the following options: in order of start date, sorted by increasing visit length, and sorted by decreasing visit length.

Labels at the top of each line represent pages in the site. Pages can be selected by clicking on them with the mouse and pages can be grouped together into a single column. This allows the user to treat common pages as one and reduce the complexity of the display.

Once a user has noticed a visual pattern, they can select the appropriate links and use a menu option to define it as a task. For example, in FIG. 18 there is a recurring pattern going from "GUI" to "Image" to "GUI" to "Global History" and to "Annotations". Then that task can be colored and the present invention will display in the view everywhere the task occurs in the set of visits. This can indicate to the user whether or not this task is a common task performed by the visitors, something they might wish to further analyze.

Examples of Task Regular Expression Matching

Example regular expressions are shown and used to do the task identification in a preferred embodiment of the present invention's task identification algorithm. In this example the task is 3 steps with the last step having 7 pages:

T: P01 P09 (P10 P11 P12 P13 P14 P15 P16)

Direct task completion, match all or match all not overlapping or match first or match $n^{th}$:

Completed task regex:
(p01)(p09)(p10|p11|p12|p13|p14|p15|p16)
Sub-task through step 2 regex:
(p01)(p09)
Sub-task through step 1 regex:
(p01)
To find completed paths including referral and next regex:
([a-zA-Z][0-9][0-9])(p01)(p09)
(p10|p11|p12|p13|p14|p15|p16)([a-zA-Z][0-9][0-9])
where ([a-zA-Z][0-9][0-9]) matches any page in the session.

Indirect task completion, match all or match all not overlapping or match first or match n$^{th}$:
Completed task regex:
((p01)+)([a-zA-Z][0-9][0-9])*?((p09)+)([a-zA-Z][0-9][0-9])*?((p10|p11|p12|p13|p14|p15|p16)+)
where "*?" is a non-greedy 0 or more match.
Sub-task through step 2 regex:
((p01)+)([a-zA-Z][0-9][0-9])*?((p09)+)
Sub-task through step 1 regex:
((p01)+)
To find completed paths including referral and next regex:
([a-zA-Z][0-9][0-9])((p01)+)([a-zA-Z][0-9][0-9])*?((p09)+)([a-zA-Z][0-9][0-9])*?
((p10|p11|p12|p13|p14|p15|p16)+)([a-zA-Z][0-9][0-9])
Direct task completion, match head:
Completed task regex:
^((i|d|o)[0-9][0-9])(p01)(p09)(p10|p11|p12|p13|p14|p15|p16)
where the session string being matched is guaranteed to have an inside, outside, or dummy node at the beginning.
Sub-task through step 2 regex:
^((i|d|o)[0-9][0-9])(p01)(p09)
Sub-task through step 1 regex:
^((i|d|o)[0-9][0-9])(p01)
To find completed paths including referral and next regex:
^([a-zA-Z][0-9][0-9])(p01)(p09)
(p10|p11|p12|p13|p14|p15|p16)([a-zA-Z][0-9][0-9])
Direct task completion, match tail:
Completed task regex:
(p01)(p09)(p10|p11|p12|p13|p14|p15|p16)((i|d|o)[0-9][0-9])$
Sub-task through step 2 regex:
(p01)(p09)(?!p10|p11|p12|p13|p14|p15|p16)([a-zA-Z][0-9][0-9])((i|d|o)[0-9][0-9])$
where "?!" means the next match doesn't match any one of the specified group.
Sub-task through step 1 regex:
(p01)(?!p09)([a-zA-Z][0-9][0-9])
(?!p10|p11|p12|p13|p14|p15|p16)([a-zA-Z][0-9][0-9])
((i|d|o)[0-9][0-9])$
To find completed paths including referral and next regex:
([a-zA-Z][0-9][0-9])(p01)(p09)
(p10|p11|p12|p13|p14|p15|p16)([a-zA-Z][0-9][0-9])$ Numerous characteristics and advantages have been set forth in the foregoing description, together with details of methods, systems, structure and function. While the invention has been disclosed in its preferred form, it will be apparent to those skilled in the art that many modifications, additions, and deletions can be made therein without departing from the spirit and scope of the invention and its equivalents as set forth in the following claims. Therefore, other modifications or embodiments as may be suggested by the teachings herein are particularly reserved especially as they fall within the breadth and scope of the claims here appended.

What is claimed is:

1. A computer implemented method for analyzing user interaction with a system, wherein the system comprises a plurality of states linked by a navigation structure and a user interface for navigating between the states, the method comprising:
defining a first task as including a predefined first sequence of user accesses to two or more of the plurality of states;
accessing user session data representative of a session of first user's interaction with the system, the session including a second sequence of user accesses to two or more of the plurality of states;
configuring a computer processor to execute a pattern-matching algorithm to compare the second sequence of user accesses in the user session data to the first sequence of user accesses in the first task to determine whether at least a portion of the first task was performed by the first user;
determining differences between the user session data and the first task if at least a portion of the first task was performed by the first user; and
generating a recommendation for altering one or more of the plurality of states of the system, based on the determined differences between the user session data and the first task, to assist future users in performing the first task.

2. The method of claim 1 further comprising the step of graphically displaying the recommendation.

3. The method of claim 1 further comprising the step of modifying the system based on the recommendation.

4. The method of claim 1 further comprising the step of filtering the interaction.

5. The method of claim 1, wherein the system is a web site, and wherein the states are pages of the web site.

6. The method of claim 1, wherein the system is a web application, and wherein the states are logical states of the web application.

7. The method of claim 1, wherein the system is an interactive voice response, and wherein the states are voice response prompts.

8. The method of claim 1, wherein the step of defining a task enables user definition of the task.

9. The method of claim 1, wherein the step of defining the first task is provided by a user via a task editor.

10. The method of claim 1, wherein the step of defining the first task enables user definition of the first task, the user selecting a focal step of interest, the direction of the first task with respect to the focal step, and length of the first task.

11. The method of claim 1 further comprising the step of identifying from the interaction with the system the number of direct task completions during the sessions, wherein direct task completion comprises completing a task without an intervening step in a predefined sequence of the task.

12. The method of claim 1 further comprising the step of identifying from the interaction with the system the number of indirect task completions during the sessions, wherein indirect task completion comprises completing a task with an intervening step in a predefined sequence of the task.

13. The method of claim 1 further comprising the step of identifying from the interaction with the system the number of task completions during the sessions.

14. The method of claim 1, wherein a task completion is defined by the group consisting of match all, match all not overlapping, match all not overlapping only after completion, match first, match n$^{th}$, match head and match tail.

15. The method of claim 1 further comprising the step of identifying an average number of interactions to complete the first task in the session.

16. The method of claim 1 further comprising the step of identifying the number of interactions to complete the first task, and wherein the task statistic includes the average number of interactions to complete the task in the session divided by the minimum number of interactions to complete the task.

17. The method of claim 1 further comprising the step of graphically displaying a task overview providing one or more of an overview of the recommendation, paths through the first task, and related tasks.

18. The method of claim 1 further comprising the step of graphically displaying a representation of interactions through the states of the first task.

19. A computer implemented method for analyzing user interaction with a website, wherein the website comprises a plurality of web pages linked by a navigation structure and a user interface for navigating between the web pages, the method comprising:
 defining a first task as a predefined set of user accesses to two or more of the plurality of web pages;
 accessing user session data representative of a website session of user interaction with the website;
 configuring a computer processor to execute a pattern-matching algorithm to determine whether at least a subset of the first task occurs in the user session data;
 identifying anomalies between the first task and the user session data if at least a subset of the first task occurs in the user session data; and
 presenting a statistical analysis of the anomalies between the user session data and the first task, and a recommendation for altering one or more of the plurality of the web pages to reduce the anomalies for future users.

20. The method of claim 19 further comprising the step of modifying the system based on the recommended system modifications.

21. The method of claim 20, wherein the step of identifying from the interactions with the web site the occurrence of the task steps and the paths taken through the task steps during the sessions comprises identifying from the filtered interactions with the web site the occurrence of the task steps and the paths taken through the task steps during the sessions.

22. The method of claim 21, wherein the step of filtering the interactions filters the interactions according to the group consisting of time of interaction duration, time of interaction commencement and time of interaction termination.

23. The method of claim 21, wherein the step of filtering the interactions filters the interactions according to the group consisting of whether the first step in the interaction is/is not one of a predefined set of steps, whether the last step in the interaction is/is not one of a predefined set of steps, and whether a referral for the interaction is/is not one of a predefined set of referrals.

24. The method of claim 21, wherein the step of filtering the interactions filters the interactions according to whether an interaction includes/does not include a predefined set of steps.

25. The method of claim 21, wherein the step of filtering the interactions filters the interactions according to the number of discrete users providing the interactions.

26. The method of claim 21, wherein the step of filtering the interactions filters the interactions according to the geography of a user providing the interactions.

27. The method of claim 21, wherein the step of filtering the interactions filters the interactions according to the platform utilized by a user providing the interactions.

28. The method of claim 21, wherein the step of filtering the interactions filters the interactions according to the group of task characteristics consisting of task completion, task non-completion, start of a task, and start of a task that is not complete.

29. The method of claim 19 further comprising the step of filtering the interactions.

30. The method of claim 19, wherein the step of defining the first task comprises defining the first task as pages of the web site linked from a common referring web page.

31. The method of claim 30, wherein the step of defining the first task comprises defining the first task as the page identified by the $n^{th}$ link provided by the common referring web page.

32. The method of claim 19, wherein the step of defining the first task comprises visual task selection via a visit tracker display of sequential interactions with the system by recognizing visual patterns.

33. The method of claim 19, wherein the step of defining the first task comprises exhaustive dominant task detection.

34. The method of claim 19 further comprising the step of determining from the interactions with the web site the performance of the first task according to a task analysis characteristic.

35. The method of claim 34, wherein the task analysis characteristic is direct task completion, wherein direct task completion comprises completing the first task without an intervening step in the predefined first sequence of the task.

36. The method of claim 34, wherein the task analysis characteristic is indirect task completion, wherein indirect task completion comprises completing the first task with an intervening step in the predefined first sequence of the task.

37. The method of claim 34, wherein the task analysis characteristic is the number of task completions.

38. The method of claim 37, wherein a task completion is defined by the group consisting of match all, match all not overlapping, match all not overlapping only after completion, match first, match $n^{th}$, match head and match tail.

39. The method of claim 19, further comprising the step of compiling a list of anomalies in the occurrence of the task.

40. The method of claim 19, further comprising the step of compiling a list of trends in the occurrence of the task.

* * * * *